(12) United States Patent
Zou et al.

(10) Patent No.: US 11,486,533 B1
(45) Date of Patent: Nov. 1, 2022

(54) QUICK-ASSEMBLY SEAT, QUICK-RELEASE ASSEMBLY AND PHOTOGRAPHING APPARATUS

(71) Applicant: Shenzhen Weiji Technology Co., Ltd., Shenzhen (CN)

(72) Inventors: Qingqing Zou, Shenzhen (CN); Ranliang Yuan, Shenzhen (CN); Qiuhua Li, Shenzhen (CN); Yang Zhang, Shenzhen (CN); Wei Wei, Shenzhen (CN)

(73) Assignee: SHENZHEN WEIJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/571,571

(22) Filed: Jan. 10, 2022

(30) Foreign Application Priority Data

Nov. 16, 2021 (CN) .......................... 202111358214.2

(51) Int. Cl.
*G03B 17/56* (2021.01)
*F16M 11/04* (2006.01)
*F16M 13/02* (2006.01)

(52) U.S. Cl.
CPC .......... *F16M 11/041* (2013.01); *F16M 13/02* (2013.01); *G03B 17/561* (2013.01)

(58) Field of Classification Search
USPC ......................................................... 396/419
See application file for complete search history.

(56) References Cited

FOREIGN PATENT DOCUMENTS

| CN | 213576439 U | * | 6/2021 |
| CN | 113339664 A | * | 9/2021 |
| CN | 113639175 A | * | 11/2021 |
| CN | 113639175 A |   | 11/2021 |

* cited by examiner

*Primary Examiner* — Clayton E. LaBalle
*Assistant Examiner* — Warren K Fenwick
(74) *Attorney, Agent, or Firm* — Bayramoglu Law Offices LLC

(57) ABSTRACT

A quick-assembly seat includes a seat body, a clamping assembly and a driving assembly. The clamping assembly includes a clamping member slidably connected to the seat body, and the clamping member includes a first driving surface. The driving assembly includes a driving member slidably connected to the seat body, and the driving member includes a second driving surface. The driving member is configured to slide relative to the seat body, such that the second driving surface presses against the first driving surface, and the driving member drives the clamping member to slide relative to the seat body to clamp or unclamp a quick-release part. The quick-release assembly includes the quick-assembly seat and the quick-release part that are connected. The quick-release part can be connected to a photographing device, and the seat body can be mounted on a bracket. The photographing device can be quickly assembled on the bracket and disassembled.

19 Claims, 18 Drawing Sheets

QUICK-ASSEMBLY SEAT, QUICK-RELEASE ASSEMBLY AND PHOTOGRAPHING APPARATUS

CROSS REFERENCE TO THE RELATED APPLICATIONS

This application is based upon and claims priority to Chinese Patent Application No. 202111358214.2, filed on Nov. 16, 2021, the entire contents of which are incorporated herein by reference.

TECHNICAL FIELD

The present invention relates to the technical field of photographic accessories, and in particular to a quick-assembly seat, a quick-release assembly and a photographing apparatus.

BACKGROUND

Photography is becoming increasingly popular, and people like to record their daily life through photography. Photography can be done by photographing devices such as mobile phones and cameras. In order to facilitate photographing and achieve better photographing effect, the photographing device is usually fixed on a bracket such that the position of the photographing device can be fixed conveniently. In order to quickly assemble and disassemble the photographing device on the bracket, a transition piece is typically attached to the photographing device, and then the transition piece is threadedly connected to the bracket, so that the photographing device is mounted on the bracket for convenient use. However, it is time-consuming and laborious to assemble and disassemble the photographing device on the bracket through threaded connection, which is inconvenient in use.

SUMMARY

The present invention provides a quick-assembly seat, a quick-release assembly and a photographing apparatus. The present invention solves the problem of time-consuming and laborious disassembly and assembly and the inconvenient use of a photographing device mounted on a bracket by means of threaded connection.

A first aspect of the present invention provides a quick-assembly seat. The quick-assembly seat includes a seat body, a clamping assembly and a driving assembly, where the clamping assembly includes a clamping member slidably connected to the seat body; the driving assembly includes a driving member slidably connected to the seat body; and the driving member is configured to slide relative to the seat body to press against the clamping member and drive the clamping member to slide relative to the seat body to clamp or unclamp a quick-release part.

The driving member of the quick-assembly seat is configured to slide relative to the seat body, such that the second driving surface of the driving member presses against the first driving surface of the clamping member. In this way, the driving member drives the clamping member to slide relative to the seat body to clamp or unclamp the quick-release part. The quick-release part can be connected to a photographing device, and the seat body can be mounted on a bracket. Therefore, the photographing device can be quickly assembled on the bracket and disassembled, saving time and effort.

A second aspect of the present invention further provides a quick-release assembly. The quick-release assembly includes a quick-release part and the quick-assembly seat, where a side of the quick-release part facing the quick-assembly seat is provided with a clamping groove, and the clamping groove is matched with the clamping member for clamping; and the driving member is configured to slide relative to the seat body to press against the clamping member, thereby driving the clamping member to slide relative to the seat body to unclamp the quick-release part.

A third aspect of the present invention further provides a photographing apparatus. The photographing apparatus includes an electronic device and the quick-release assembly; and the electronic device is mounted on the quick-release part.

Figure 1:
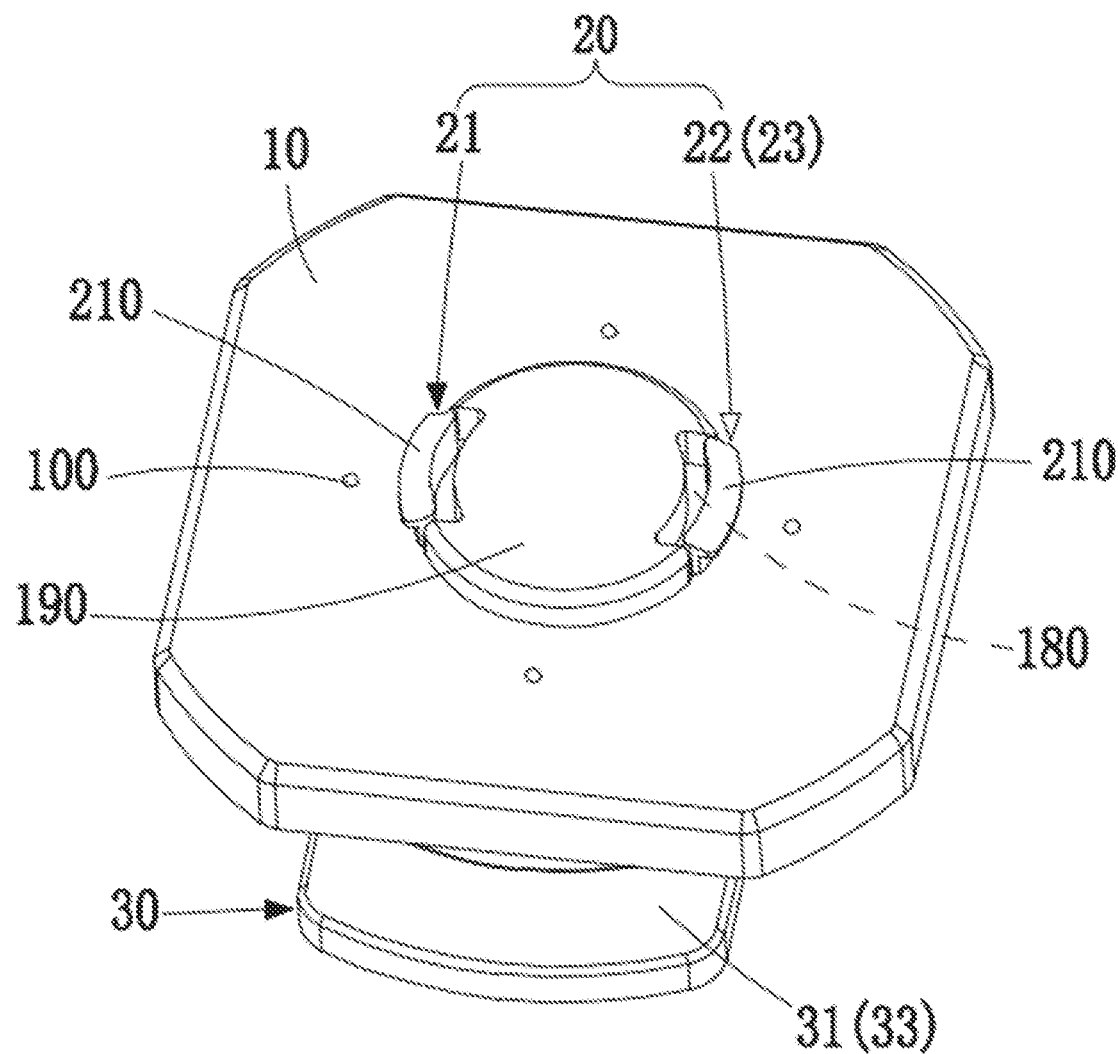
FIG. 1 is a structural view of a quick-assembly seat in a clamped state according to a first embodiment of the present invention.
Figure 2:
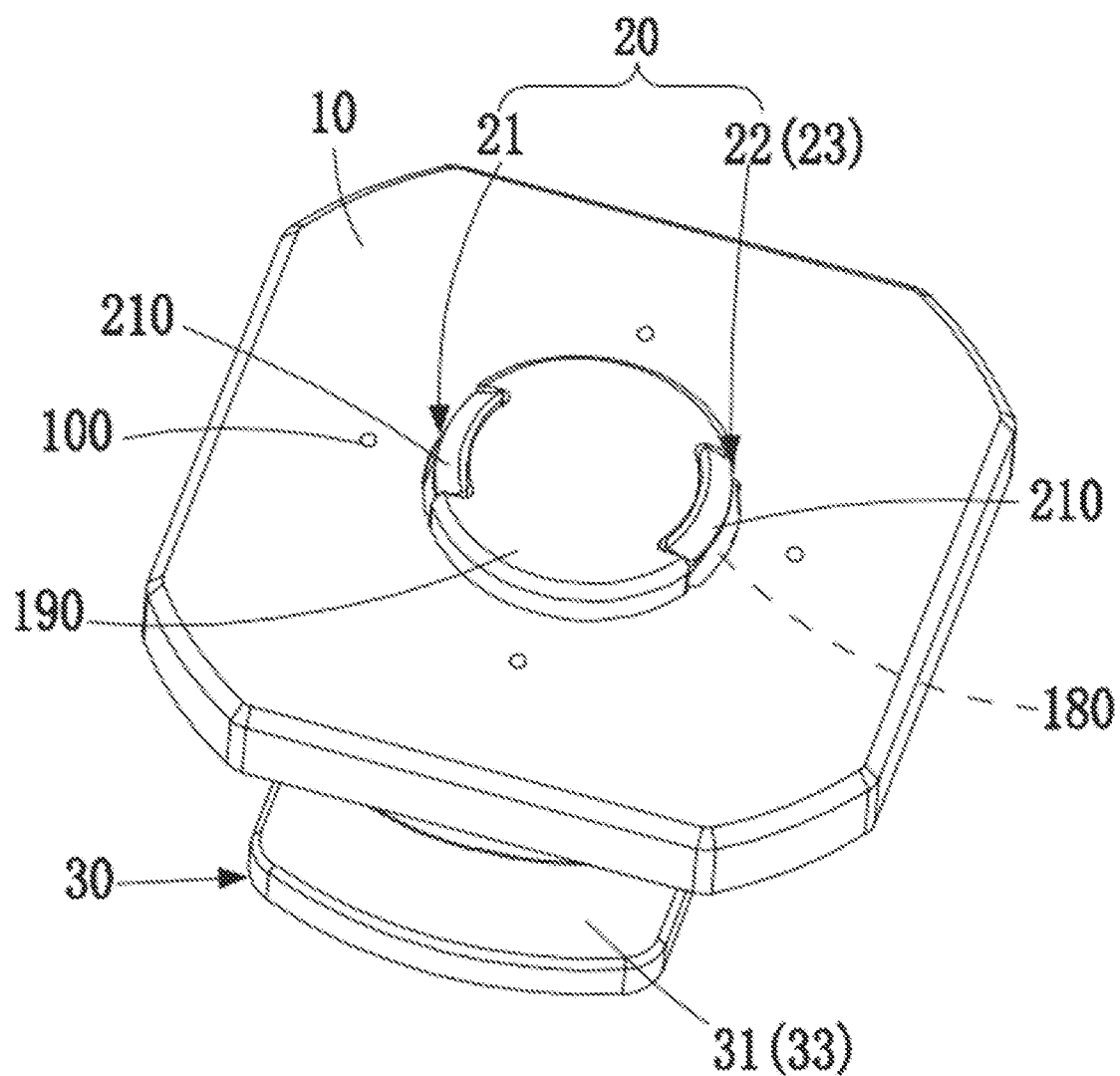
FIG. 2 is a structural view of the quick-assembly seat in an unclamped state according to the first embodiment of the present invention.

Reference Numerals:

1. quick-assembly seat; and 2. quick-release assembly;

10. seat body; 100. positioning protrusion; 110. positioning post; 120. magnetic member; 130. screw hole; 140. connecting groove; 150. guide member; 160. bottom cover; 170. fixing groove; 180. limiting hole; 190. positioning base; and 191. positioning groove;

20. clamping assembly; 21. first clamping member; 22. second clamping member; 200. first driving surface; 210. hook; 2100. clamping flange; 220. connecting piece; 221. first strip-shaped element; 222. second strip-shaped element; 230. first return spring; 23. clamping member; 231. first driving edge; 232. second driving edge; 24. third clamping member; 25. fourth clamping member; 26. second return spring; and 27. elastic member;

30. driving assembly; 31. first driving member; 32. second driving member; 300. second driving surface; 310. limiting hole; 320. driving groove; 33. driving member; 330. conical end; 331. through hole; 332. limiting flange; 333. driving flange; 334. stroke groove; 34. third return spring; and 35. guide groove; and 40. quick-release part; 400. clamping groove; 410. accommodating groove; and 420. protruding base.

DETAILED DESCRIPTION OF THE EMBODIMENTS

To make the above objectives, features and advantages of the present invention more comprehensible, the specific implementations of the present invention are clearly and completely described below with reference to the drawings. Obviously, the specific details described below are only part of the embodiments of the present invention, and the present invention may also be implemented in many other embodiments different from those herein. All other embodiments obtained by those of ordinary skill in the art based on the embodiments of the present invention without creative efforts should fall within the protection scope of the present invention.

It should be noted that when a component is fixed with the other component, the component may be fixed with the other component directly or via an intermediate component. When a component is connected with the other component, the component may be connected with the other component directly or via an intermediate component. The terms "vertical", "horizontal", "left", and "right" and similar expressions used herein are just for illustrative purposes, and do not mean sole implementations.

Unless otherwise defined, all technical and scientific terms used herein have the same meaning as commonly understood by those skilled in the technical field of the present invention, The terms mentioned herein are merely for the purpose of describing specific embodiments, rather than to limit the present invention.

Referring to FIGS. 1 to 8, the present invention provides a quick-assembly seat 1. The quick-assembly seat 1 is configured to be quickly detachably clamped with a quick-release part 40. The quick-assembly seat 1 may be connected to a mounting position such as a tripod, and the quick-release part 40 may be connected to an electronic device such as a mobile phone or a camera. The quick-assembly seat 1 and the quick-release part 40 are detachably clamped, such that a photographing device can be mounted on the tripod, which is convenient for photographing. In addition, the photographing device can be quickly assembled on the tripod and disassembled, saving time and effort.

Figure 8:
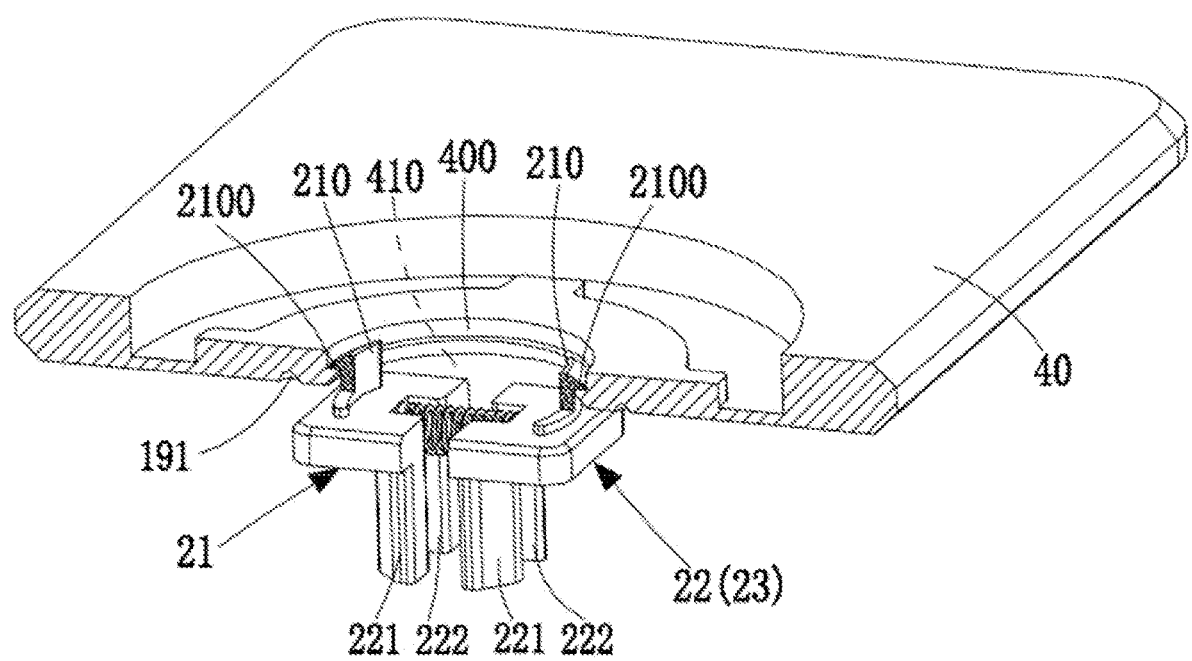
FIG. 8 is a connection view of the clamping assembly of the quick-assembly seat and a quick-release part according to the first embodiment of the present invention.

As shown in FIGS. 1 and 8, in an embodiment, the quick-assembly seat 1 includes a seat body 10, a clamping assembly 20 and a driving assembly 30, The clamping assembly 20 includes a clamping member 23 slidably connected to the seat body 10. The driving assembly 30 includes a driving member 33 slidably connected to the seat body 10. The driving member 33 is configured to slide relative to the seat body 10 when receiving an external force, so as to press the clamping member 23 and make the clamping member 23 slide relative to the seat body 10. In this way, the clamping member 23 is clamped or unclamped with the quick-release part 40.

The abutting manner of the driving member 33 and the clamping member 23 is not limited, and mainly includes point-to-surface abutment, surface-to-edge abutment, edge-to-surface abutment, and surface-to-surface abutment.

Figure 9:
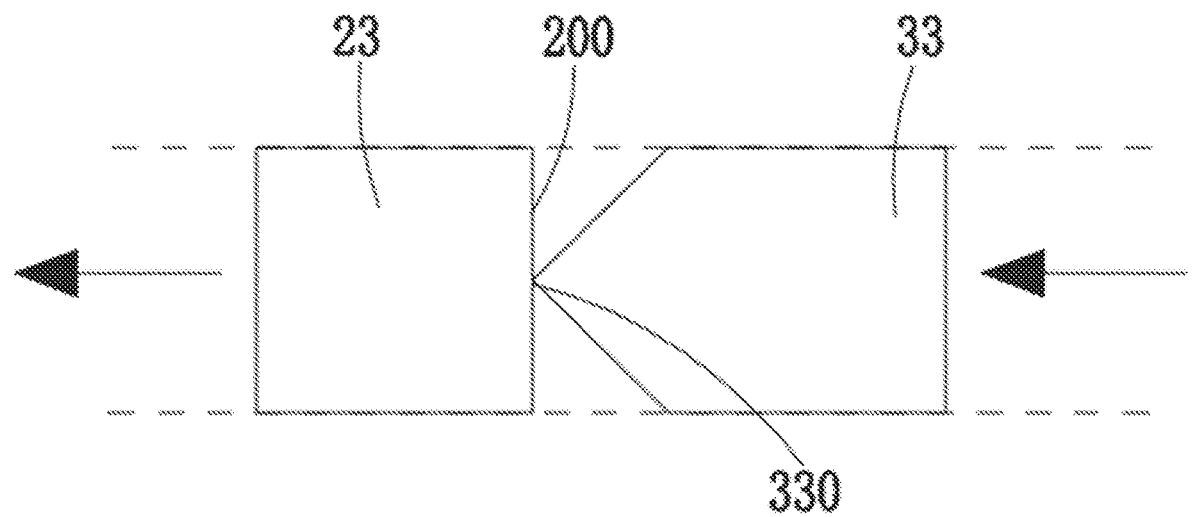
FIG. 9 is a schematic view showing that a driving member drives a clamping member to move according to the present invention.

As shown in FIG. 9, in an embodiment, the driving member 33 and the clamping member 23 are in point-to-surface abutment. Specifically, an end of the driving member 33 facing the clamping member 23 may be provided in a conical shape. The clamping member 23 includes a first driving surface 200 facing the driving member 33, and the first driving surface 200 may be perpendicular to a sliding direction of the driving member 33. The driving member 33 configured to slide relative to the seat body such that an conical end 330 of the driving member presses against the surface of the clamping member 23, thereby driving the clamping member 23 to slide relative to the seat body until the clamping member 23 is clamped or unclamped with the quick-release part. In this embodiment, the clamping member 23 and the driving member 33 have the same sliding direction.

Figure 10:
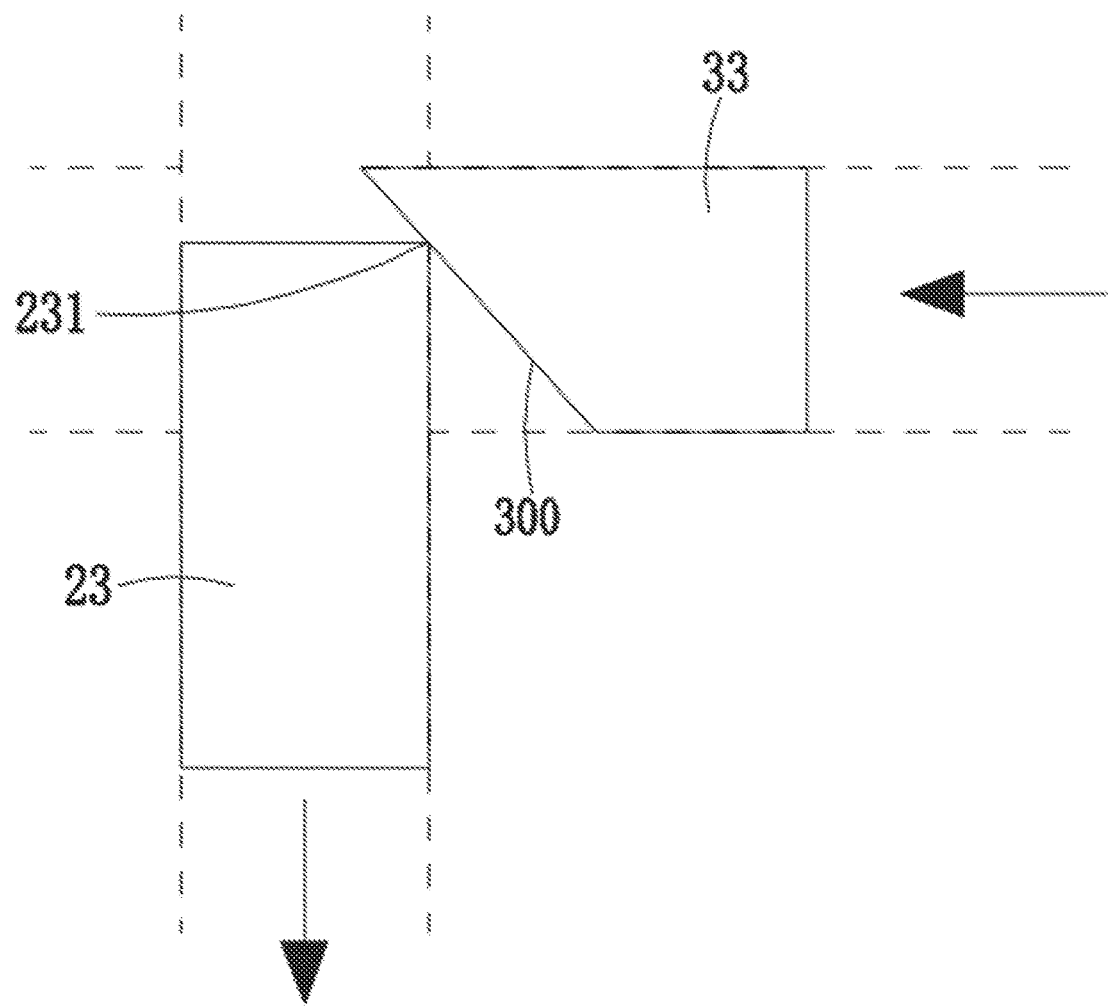
FIG. 10 is a schematic view showing that a driving member drives a clamping member to move according to the present invention.

As shown in FIG. 10, in another embodiment, the driving member 33 and the clamping member 23 are in surface-to-edge abutment, Specifically, the clamping member 23 includes a first driving edge 231 facing the driving member 33, The driving member 33 includes a second driving surface 300 facing the clamping member 23. The sliding directions of the second driving surface 300 and the driving member 33 are not perpendicular but form an angle, which is not limited, and may be greater than 0° and less than 90°. In this embodiment, the angle is 45°. The driving member 33 is configured to slide relative to the seat body 10, such that its second driving surface 300 presses against the first driving edge 231 of the clamping member 23, thereby driving the clamping member 23 to slide relative to the seat body 10 until the clamping member 23 is clamped or unclamped with the quick-release part. In this embodiment, the sliding directions of the clamping member 23 and the driving member 33 are perpendicular to each other.

Figure 11:
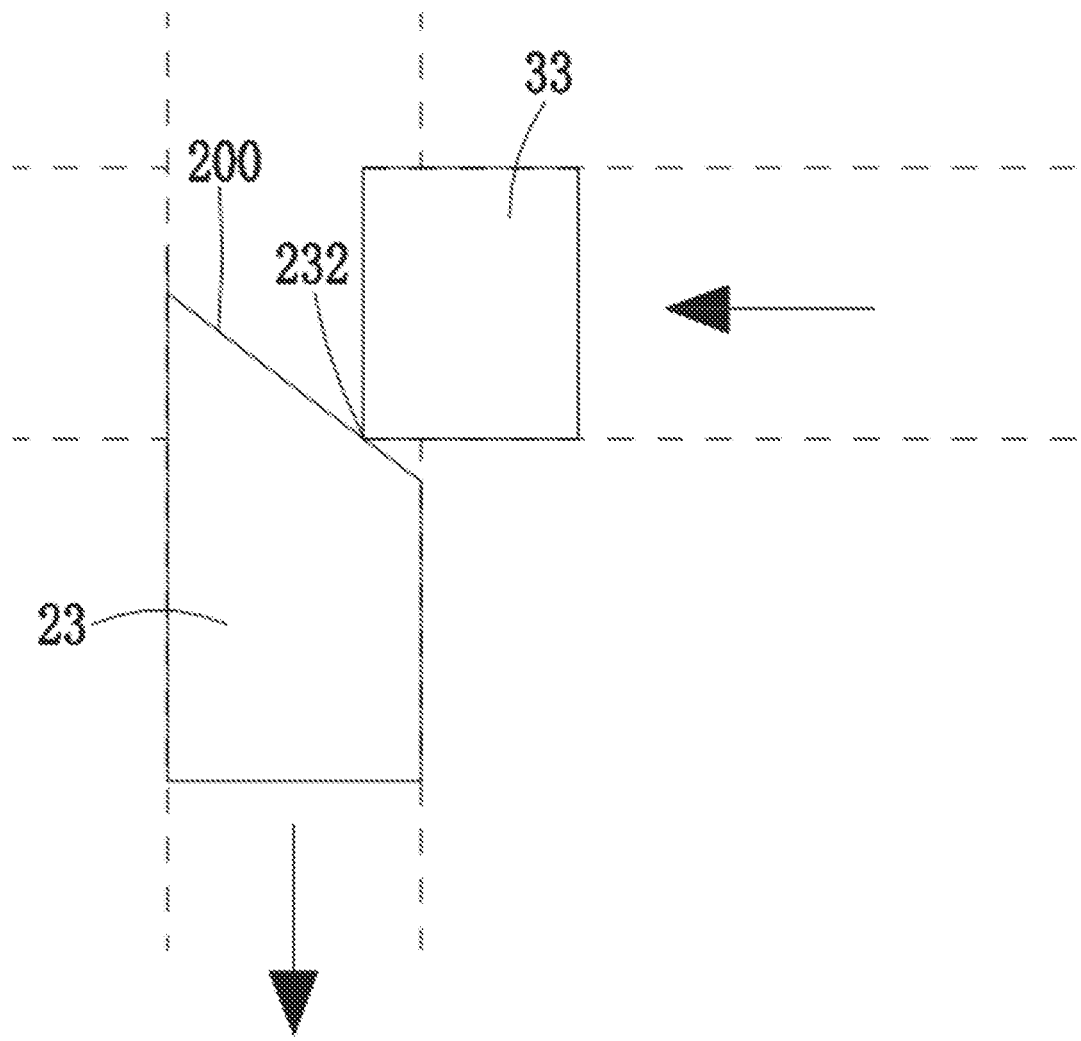
FIG. 11 is a schematic view showing that a driving member drives a clamping member to move according to the present invention.

As shown in FIG. 11, in another embodiment, the driving member 33 and the clamping member 23 are in edge-to-surface abutment. Specifically, the clamping member 23 includes a first driving surface 200 facing the driving member 33. The driving member 33 includes a second driving edge 232 facing the clamping member 23. The sliding directions of the first driving surface 200 and the driving member 33 are not perpendicular but form an angle, which is not limited, and may be greater than 0° and less than 90°. In this embodiment, the angle is 45°. The driving member 33 is configured to slide relative to the seat body 10 such that the second driving edge 232 presses against the first driving surface 200 of the clamping member 23, thereby driving the clamping member 23 to slide relative to the seat body until the clamping member 23 is clamped or unclamped with the quick release part. In this embodiment, the sliding directions of the clamping member 23 and the driving member 33 are perpendicular to each other.

In another embodiment, the driving member 33 and the clamping member 23 are in surface-to-surface abutment. Specifically, the clamping member 23 includes a first driving surface 200 facing the driving member 33, and the driving member 33 includes a second driving surface 300 facing the clamping member 23. The shapes of the first driving surface 200 and the second driving surface 300 are not limited, and they may be flat or arc surfaces, etc. In case of a flat surface, the flat surface may be a vertical surface perpendicular to the sliding direction of the driving member 33 (hereinafter referred to as a vertical surface), and it may also be an inclined surface that is not perpendicular to the sliding direction of the driving member 33 and forms an angle (hereinafter referred to as an inclined surface).

Figure 12:
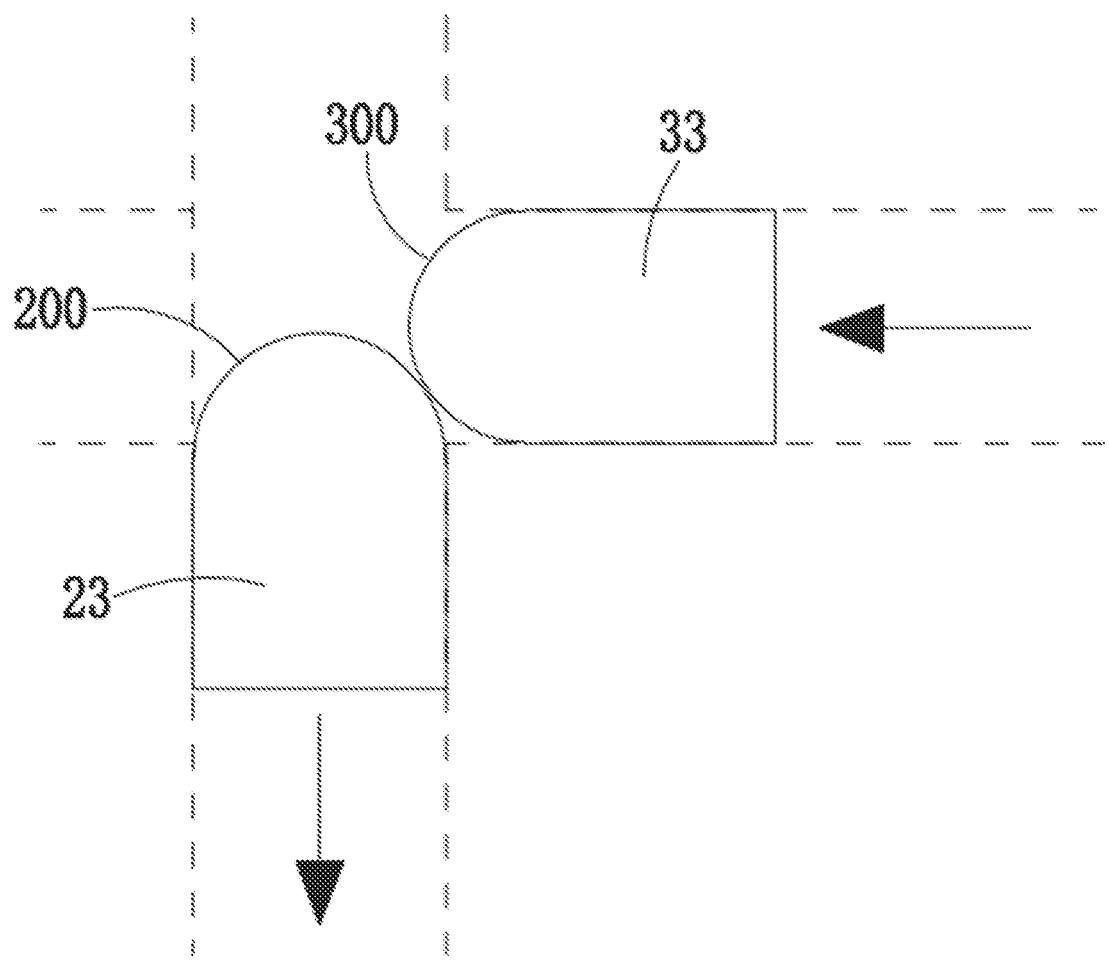
FIG. 12 is a schematic view showing that a driving member drives a clamping member to move according to the present invention.

As shown in FIG. 12, in an embodiment, the first driving surface 200 and the second driving surface 300 are arc surfaces. The driving member 33 is configured to slide relative to the seat body, such that the second driving surface 300 presses against the first driving surface 200 of the clamping member 23, thereby driving the clamping member 23 to slide relative to the seat body until the clamping member 23 is clamped or unclamped with the quick-release part. In this embodiment, the sliding directions of the clamping member 23 and the driving member 33 are perpendicular to each other.

Figure 13:
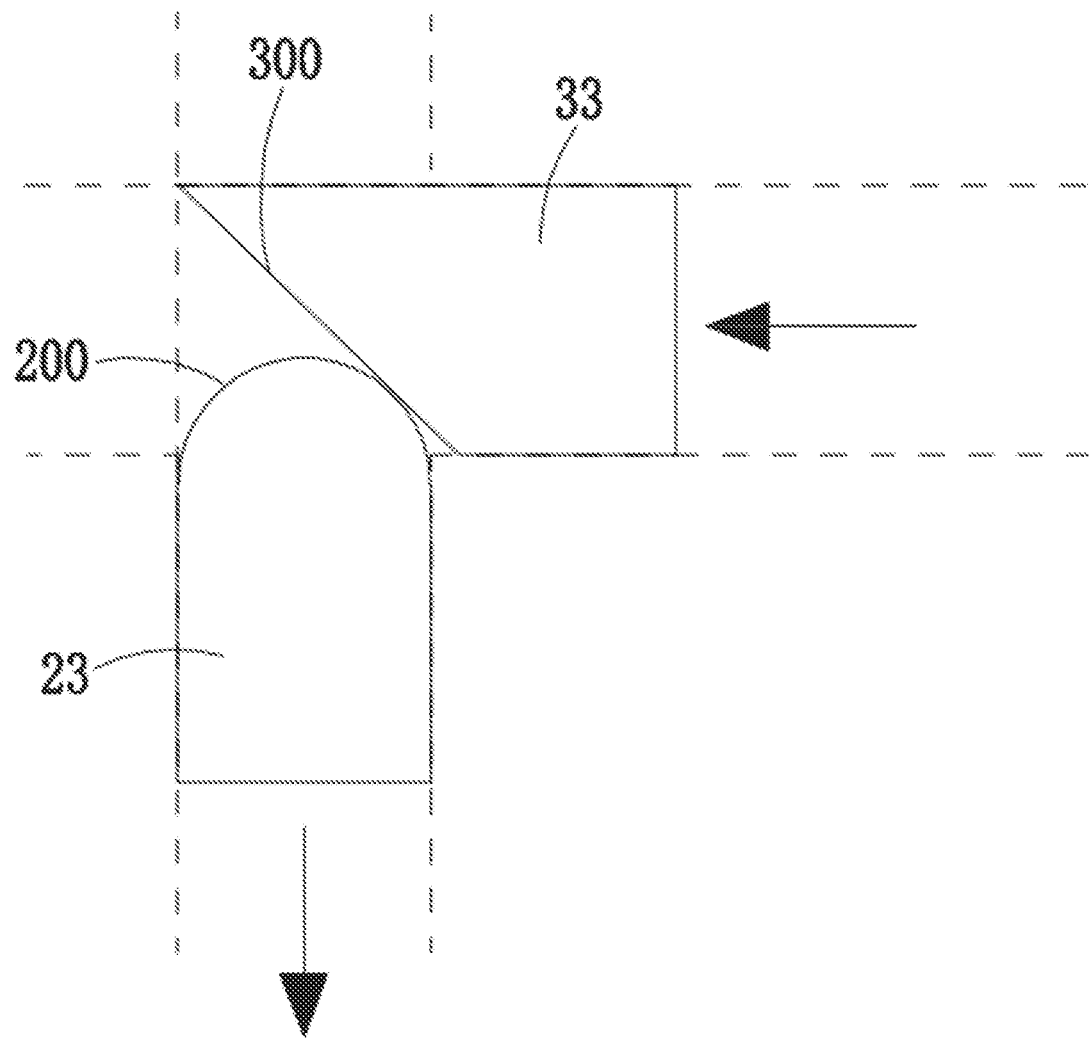
FIG. 13 is a schematic view showing that a driving member drives a clamping member to move according to the present invention.
Figure 14:
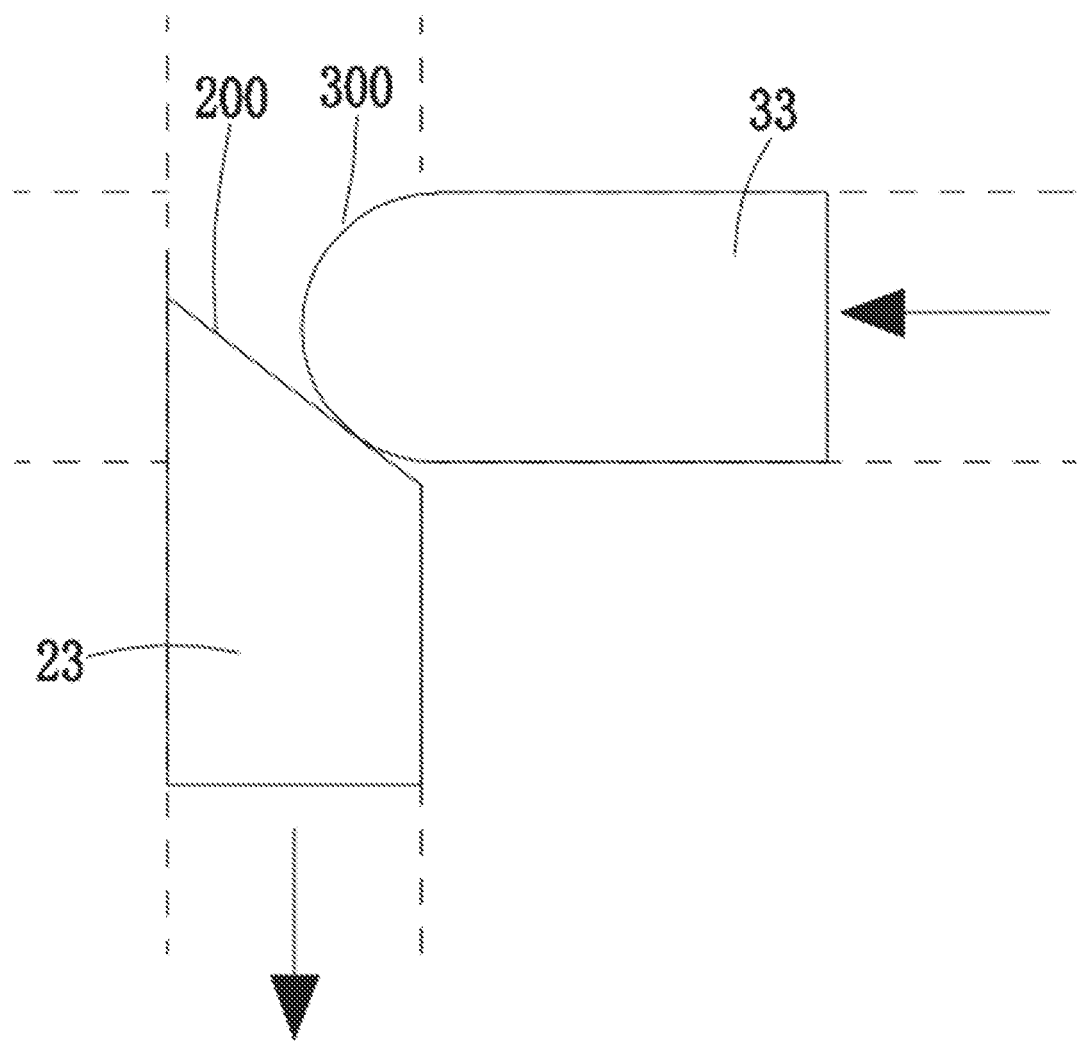
FIG. 14 is a schematic view showing that a driving member drives a clamping member to move according to the present invention.

As shown in FIGS. 13 and 14, in another embodiment, the first driving surface 200 is an arc surface, and the second driving surface 300 is an inclined surface. Alternatively, the first driving surface 200 is an inclined surface, and the second driving surface 300 is an arc surface. The driving member 33 is configured to slide relative to the seat body, such that the second driving surface 300 presses against the first driving surface 200 of the clamping member 23, thereby driving the clamping member 23 to slide relative to the seat body until the clamping member 23 is clamped or unclamped with the quick-release part. In this embodiment, the sliding directions of the clamping member 23 and the driving member 33 are perpendicular to each other.

Figure 15:
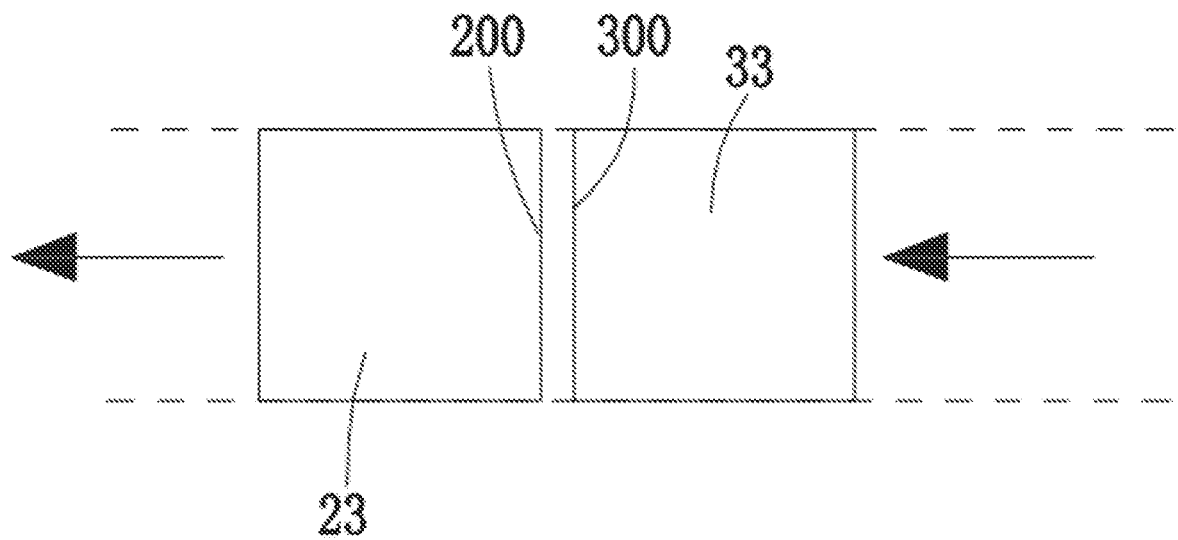
FIG. 15 is a schematic view showing that a driving member drives a clamping member to move according to the present invention.

As shown in FIG. 15, in another embodiment, the first driving surface 200 and the second driving surface 300 are vertical surfaces. When the driving member 33 slides relative to the seat body, the second driving surface 300 is completely attached to the first driving surface 200, thereby driving the damping member 23 to slide relative to the seat body until the clamping member 23 is clamped or unclamped with the quick-release part. In this embodiment, the first driving surface 200 and the second driving surface 300 are in sufficient contact to define a large stressed area. A user can push the driving member 33 with less effort, and the driving member 33 can stably drive the clamping member 23 to slide, such that the clamping member 23 can be clamped or unclamped with the quick-release part. In this embodiment, the clamping member 23 and the driving member 33 have the same sliding direction.

Figure 16:
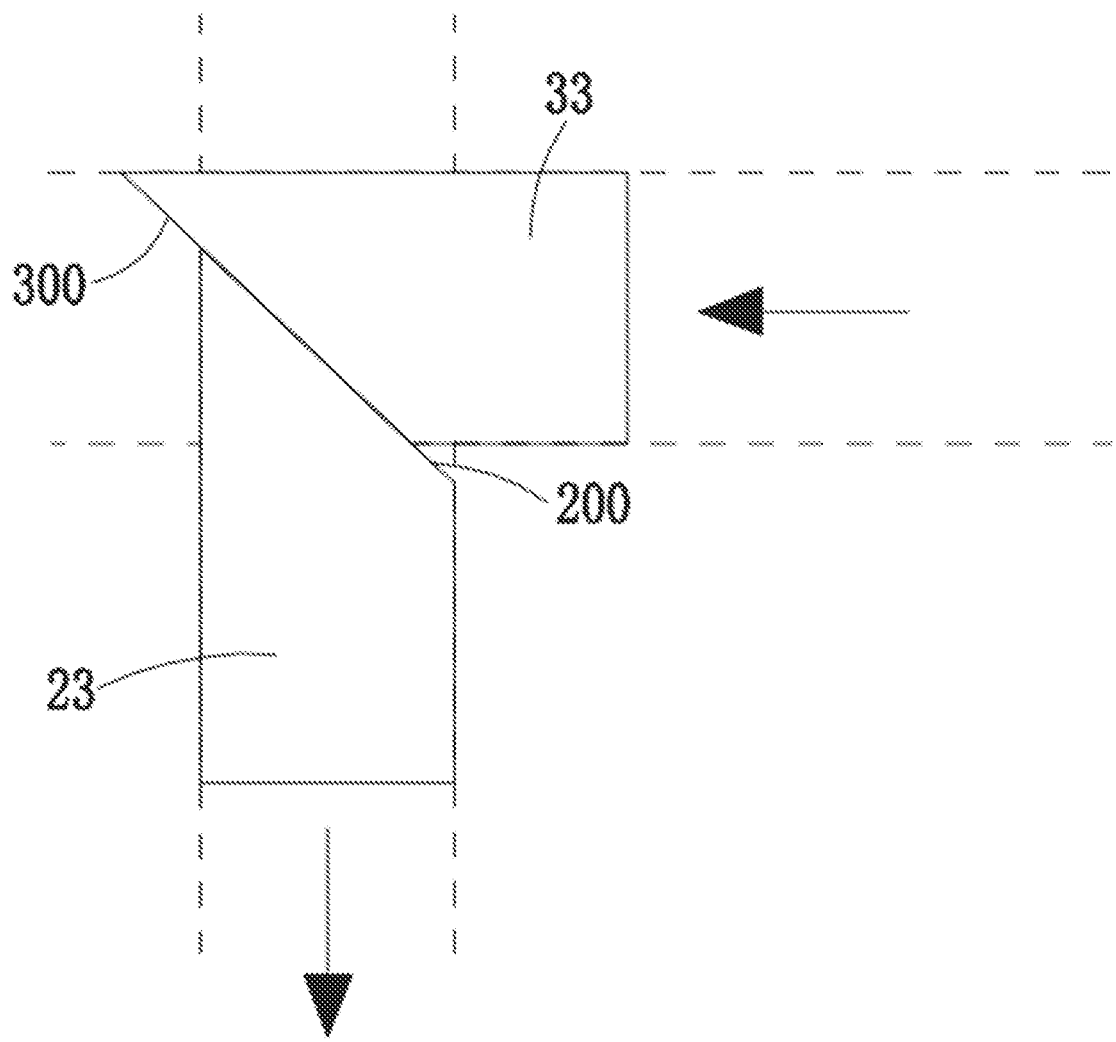
FIG. 16 is a schematic view showing that a driving member drives a clamping member to move according to the present invention.
Figure 17:
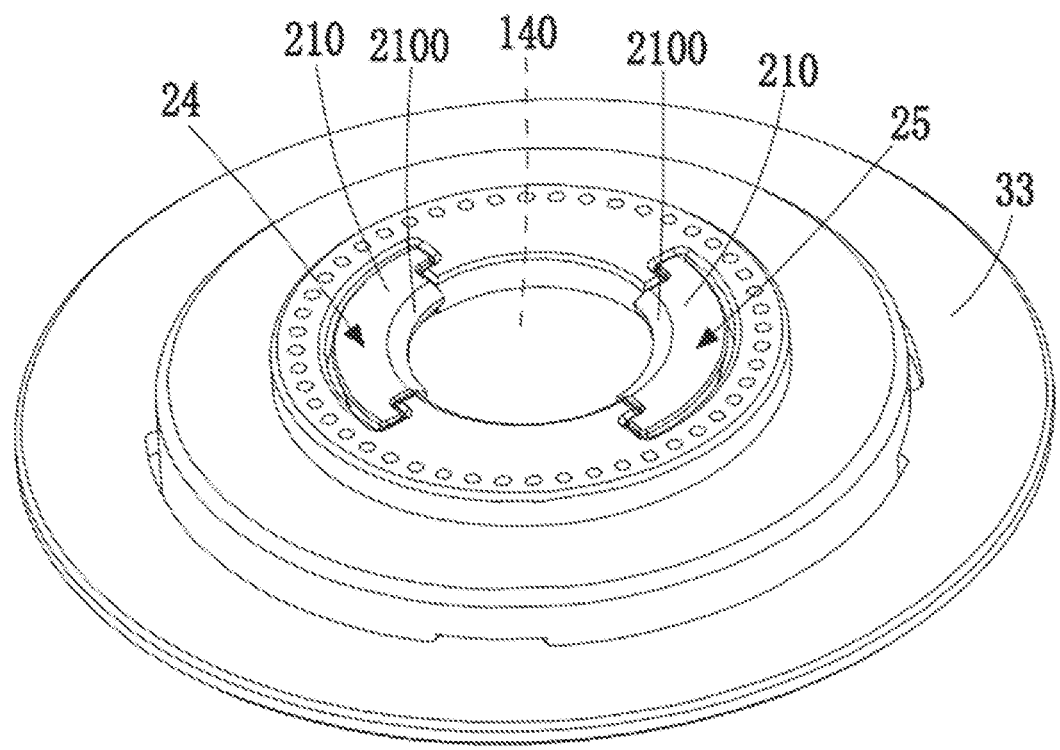
FIG. 17 is a structural view of a quick-assembly seat from an angle according to a second embodiment of the present invention.

As shown in FIG. 16, in another embodiment, the first driving surface 200 and the second driving surface 300 are inclined surfaces, which respectively form an identical angle with the sliding direction of the driving member 33. When the driving member 33 slides relative to the seat body 10, the second driving surface 300 is completely attached to the first driving surface 200, thereby driving the clamping member 23 to slide relative to the seat body 10 until the clamping member 23 is clamped or unclamped with the quick-release part 40. The first driving surface 200 and the second driving surface 300 are in sufficient contact to define a large stressed area. The user can push the driving member 33 with less effort, and the driving member 33 can stably drive the clamping member 23 to slide, such that the clamping member 23 can be clamped or unclamped with the quick-release part 40. In this embodiment, the sliding directions of the clamping member 23 and the driving member 33 are perpendicular to each other.

This embodiment is in further described below, where both the first driving surface 200 and the second driving surface 300 are inclined surfaces.

Figure 5:
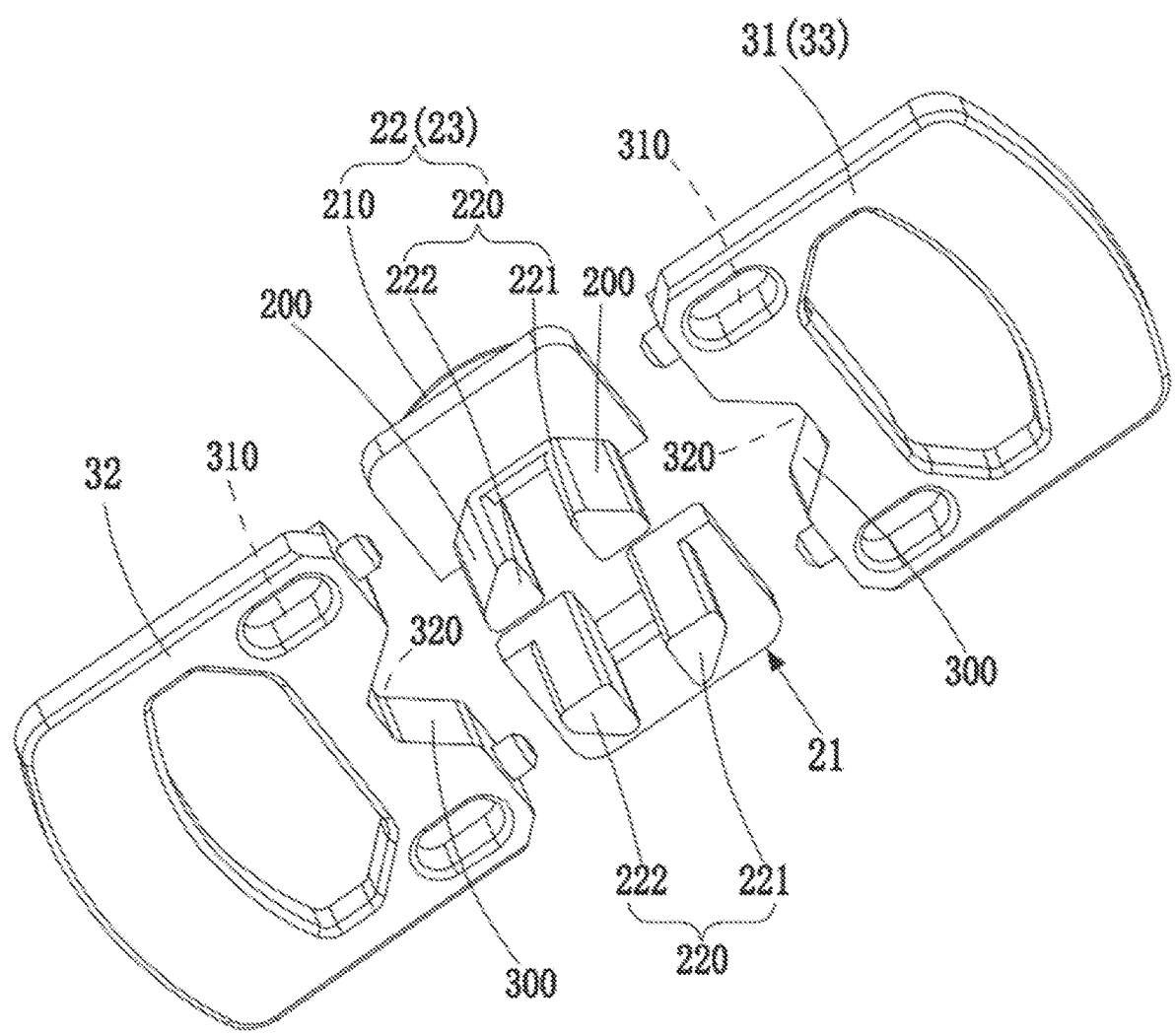
FIG. 5 is an exploded view of a driving assembly and a clamping assembly of the quick-assembly seat according to the first embodiment of the present invention.

As shown in FIGS. 1, 5 and 8, in an embodiment, the sliding direction of the driving member 33 is perpendicular to a thickness direction of the seat body 10. The clamping member 23 includes a connecting piece 220 and a hook 210 connected to each other. The hook 210 protrudes out of the seat body 10 to facilitate the clamping or unclamping with the external quick-release part 40. The first driving surface 200 is provided on the connecting piece 220. The second driving surface 300 is configured to press against the first driving surface 200 to drive the connecting piece 220 and the hook 210 to slide relative to the seat body 10, such that the hook 210 and the quick-release part 40 are clamped or unclamped. The hook 210 includes a clamping flange 2100, and the quick-release part 40 is provided with a clamping groove 400. The clamping flange 2100 is opposite to the clamping groove 400. The hook 210 is configured to slide relative to the seat body 10 to be clamped or unclamped with the clamping groove 400 such that the quick-release part 40 is engaged with or separated from the seat body 10. When the driving member 33 drives the hook 210 to slide, the clamping or unclamping of the hook 210 with the clamping groove 400 depends on whether the orientation of the clamping flange 2100 is the same as the sliding direction of the hook 210. When the sliding directions of the clamping flange 2100 and the hook 210 are the same, the clamping flange 2100 of the hook 210 moves toward the clamping groove 400 of the quick-release part 40, and the hook 210 can be clamped with the clamping groove 400 of the quick-release part 40. When the orientation of the clamping flange 2100 of the hook 210 is opposite to the sliding direction of the hook 210, the clamping flange 2100 moves away from the clamping groove 400 of the quick-release part 40. The hook 210 can be unclamped with the clamping groove 400 of the quick-release part 40, such that the quick-release part 40 can be removed from the seat body 10.

In the following further description, the driving member 33 drives the clamping member 23 to slide to separate the clamping flange 2100 of the hook 210 from the clamping groove 400 of the quick-release part 40, such that the quick-release part 40 is unclamped.

As shown in FIGS. 1, 5, 6 and 8, the clamping assembly 20 further includes an elastic member 27. One end of the elastic member 27 is connected to the seat body 10 and the other end thereof is connected to the clamping member 23. The hook 210 protrudes from a limiting hole 180 of the seat body 10. The limiting hole 180 has a certain movable space, making the hook 210 configured to slide relative to the seat body 10 to switch between a clamped position and an unclamped position. The hook 210 is clamped with the quick-release part 40 at the clamped position, and is unclamped with the quick-release part 40 at the unclamped position. In a natural state, that is, when the driving member 33 does not exert a force on the clamping member 23, the elastic member 27 presses against the clamping member 23 at the clamped position by an elastic force. When the driving member 33 exerts a force on the connecting piece 220, the second driving surface 300 of the driving member 33 presses against the first driving surface 200 of the connecting piece 220 to drive the connecting piece 220 and the hook 210 to slide relative to the seat body 10. The hook 210 slides from the clamped position to the unclamped position, such that the hook 210 is unclamped with the quick-release part 40. Thus, the quick-release part 40 is unclamped and can be removed from the seat body 10.

The elastic member 27 may also be replaced with a magnetic member, that is, the elastic force is replaced with a magnetic force to drive the clamping member 23 to slide. In this embodiment, a magnetic member is provided on the seat body 10. The clamping member 23 may be made of a magnetic material such as metal. Alternatively, a magnetic member may further be provided on the clamping member 23 such that the magnetic member on the seat body 10 generates a magnetic force on the clamping member 23. In this embodiment, the clamping member 23 is made of a metal material, and only the seat body 10 is provided with a magnetic member. When the driving member 33 drives the clamping member 23 to slide relative to the seat body 10, the clamping member 23 approaches the magnetic member, and a magnetic repulsive force is accumulated between the magnetic member and the clamping member 23. When the driving member 33 cancels the force on the clamping member 23, the magnetic member releases the magnetic repulsive force to drive the clamping member 23 to slide relative to the seat body.

The shape of the connecting piece 220 is not limited, and it may be a strip shape or a block shape. In an embodiment, the connecting piece 220 has a strip shape. That is, the connecting piece 220 includes a first strip-shaped element 221. The first strip-shaped element 221 is connected to the hook 210, and the first strip-shaped element 221 is provided with a first driving surface 200 facing the driving member 33. The driving member 33 is provided with a driving groove 320 facing the first strip-shaped element 221. The driving groove 320 of the driving member 33 forms a second driving surface 300. The second driving surface 300 and the first driving surface 200 are opposite and they respectively form an identical angle with the sliding direction of the driving member 33. When the driving member 33 slides toward the first strip-shaped element 221, the second driving surface 300 is attached to the first driving surface 200 to drive the first strip-shaped element 221 to slide relative to the seat body 10. The sliding directions of the first strip-shaped element 221 and the sliding direction of the driving member 33 are perpendicular to each other. The first strip-shaped element 221 drives the hook 210 connected there-to to slide relative to the seat body 10, such that the hook 210 is separated from the clamping groove 400 of the quick-release part 40 to unclamp the quick-release part 40.

Figure 4:
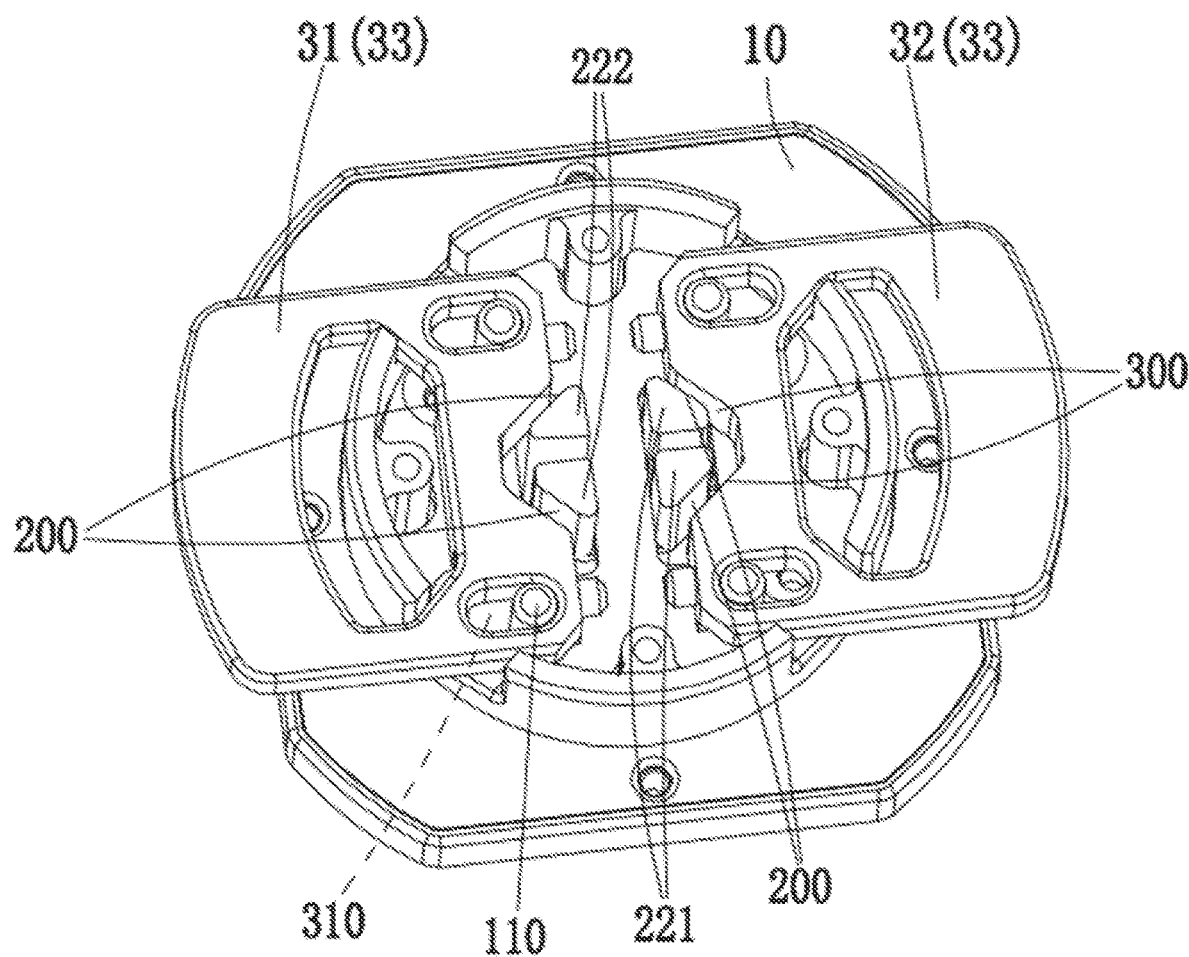
FIG. 4 is an interior view of the quick-assembly seat according to the first embodiment of the present invention.

As shown in FIGS. 4, 5 and 8, based on the previous embodiment, the connecting piece 220 may further include a second strip-shaped element 222. Both the first strip-shaped element 221 and the second strip-shaped element 222 are connected to the hook 210. The first strip-shaped element 221 and the second strip-shaped element 222 are oppositely arranged in the sliding direction of the driving member 33. In this embodiment, the driving assembly 30 may include two driving members 33, namely a first driving member 31 and a second driving member 32. The two driving members 33 are arranged opposite to each other, and the two strip-shaped elements are located between the two driving members 33. The second driving surface 300 of the first driving member 31 is opposite to the first driving surface 200 of the first strip-shaped element 221, and the second driving surface 300 of the second driving member 32 is opposite to the first driving surface 200 of the second strip-shaped element 222. The user can manually press both the first driving member 31 and the second driving member 32, such that the first driving member 31 and the second driving member 32 slide toward each other. The second driving surface 300 of the first driving member 31 presses against the first driving surface 200 of the first strip-shaped element 221, and the second driving surface 300 of the second driving member 32 presses against the first driving surface 200 of the second strip-shaped element 222. The two driving members 33 simultaneously press against the two strip-shaped elements to drive the hook 210 connected to the two strip-shaped elements to slide relative to the seat body 10. In this way, the hook 210 is separated from the clamping groove 400 of the quick-release part 40 so as to unclamp the quick-release part 40.

As shown in FIGS. 5 and 8, on the basis of the previous embodiment, the clamping assembly 20 may further include another clamping member 23. That is, the clamping assembly 20 includes a first clamping member 21 and a second clamping member 22. The first clamping member 21 and the second clamping member 22 each include a hook 210 and a first strip-shaped element 221 and a second strip-shaped element 222 connected to the hook 210. The driving grooves 320 of the first driving member 31 and the second driving member 32 are each provided with two second driving surfaces 300. The two second driving surfaces 300 of the first driving member 31 are respectively opposite to the first driving surfaces 200 of the two first strip-shaped elements 221. The two second driving surfaces 300 of the second driving member 32 are respectively opposite to the first driving surfaces 200 on the two second strip-shaped elements 222. The first driving surfaces 200 and the second driving surfaces 300 are inclined surfaces. In a direction from the first clamping member 21 to the second clamping member 22, the two first driving surfaces 200 of the first clamping member 21 are expanded, and the two first driving surfaces 200 of the second clamping member 22 are contracted. In a direction from the first driving member 31 to the second driving member 32, the two second driving surfaces 300 of the first driving member 31 are expanded, and the two second driving surfaces 300 of the second driving member 32 are contracted. The two second driving surfaces 300 press against the two first driving surfaces 200 such that the first clamping member 21 and the second clamping member 22 slide toward each other to clamp or unclamp the quick-release part 40.

Figure 6:
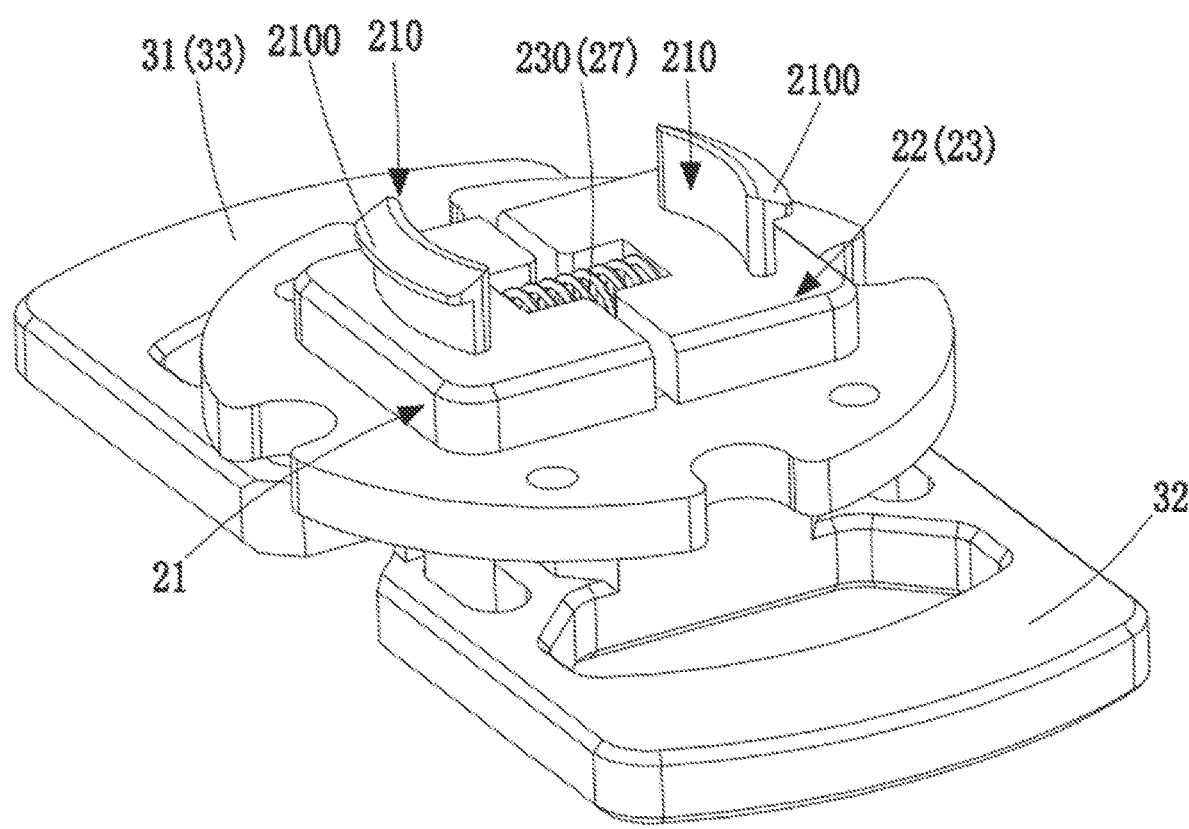
FIG. 6 is a connection view of the driving assembly and the clamping assembly of the quick-assembly seat according to the first embodiment of the present invention.

As shown in FIGS. 5, 6 and 8, a first return spring 230 is provided between the first clamping member 21 and the second clamping member 22. The user can manually press both the first driving member 31 and the second driving member 32, such that the first driving member 31 and the second driving member 32 slide toward each other. The two second driving surfaces 300 of the first driving member 31 press against the first driving surfaces 200 of the two first strip-shaped elements 221. The two first strip-shaped elements 221 slide toward each other, and the two second strip-shaped elements 222 slide toward each other. The hook 210 of the first clamping member 21 and the hook 210 of the second clamping member 22 slide toward each other. The first return spring 230 accumulates an elastic force, and the two hooks 210 are separated from the clamping groove 400 of the quick-release part 40, thereby unclamping the quick-release part 40. When the driving force on the first driving member 31 and the second driving member 32 is cancelled, the first return spring 230 releases the elastic force to drive the first clamping member 21 and the second clamping member 22 to slide away from each other. The hook 210 of the first clamping member 21 and the hook 210 of the second clamping member 22 slide to the clamped position again. When the two hooks 210 slide away from each other, the two hooks 210 respectively drive the first strip-shaped element 221 and the second strip-shaped element 222 to press against the first driving member 31 and the second driving member 32. In this way, the first driving member 31 and the second driving member 32 slide away from each other, waiting for a next time the first clamping member 21 and the second clamping member 22 are driven to unclamp the quick-release part 40.

As shown in FIG. 4, in an embodiment, positioning posts 110 are provided on the seat body 10. The first driving member 31 and the second driving member 32 are respectively provided with limiting portions, which may be limiting holes 310 or limiting slots. For example, when the limiting portions are the limiting holes 310, the positioning posts 110 are respectively provided in the limiting holes 310. The positioning posts 110 restrict the first driving member 31 and the second driving member 32 through the limiting holes 310 to prevent the first driving member 31 and the second driving member 32 from sliding excessively relative to the seat body 10 to cause damage.

As shown in FIGS. 1 and 8, in an embodiment, a surface of the seat body 10 facing the quick-release part 40 is provided with a positioning base and a plurality of positioning protrusions 100. The plurality of positioning protrusions 100 are arranged along a circumferential direction of the positioning base 190. A side of the quick-release part 40 facing the seat body 10 may be provided with an accommodating groove 410 corresponding to the positioning base 190 and positioning grooves 191 corresponding to the positioning protrusions 100. When the seat body 10 is clamped with the quick-release part 40, the positioning base 190 is inserted into the accommodating groove 410, and the positioning protrusions 100 are respectively clamped into the positioning grooves 191. Guided by the positioning base 190, the quick-release part 40 rotates relative to the seat body 10 with a central axis of the positioning base 190 as a rotation axis, thereby adjusting an angle of the photographing device. When the positioning protrusions 100 are respectively clamped into the positioning grooves 191, the quick-release part 40 and the seat body 10 can be restricted to a target angle. To adjust the relative angle between the quick-release part 40 and the seat body 10, the quick-release part 40 is unclamped, and the quick-release part 40 is rotated relative to the seat body 10 to the target angle. Then, the quick-release part 40 is pressed to make the quick-release part 40 clamped with the seat body 10. That is, the positioning protrusions 100 of the seat body 10 are respectively inserted into the positioning grooves 191 of the quick-release part 40.

Figure 7:
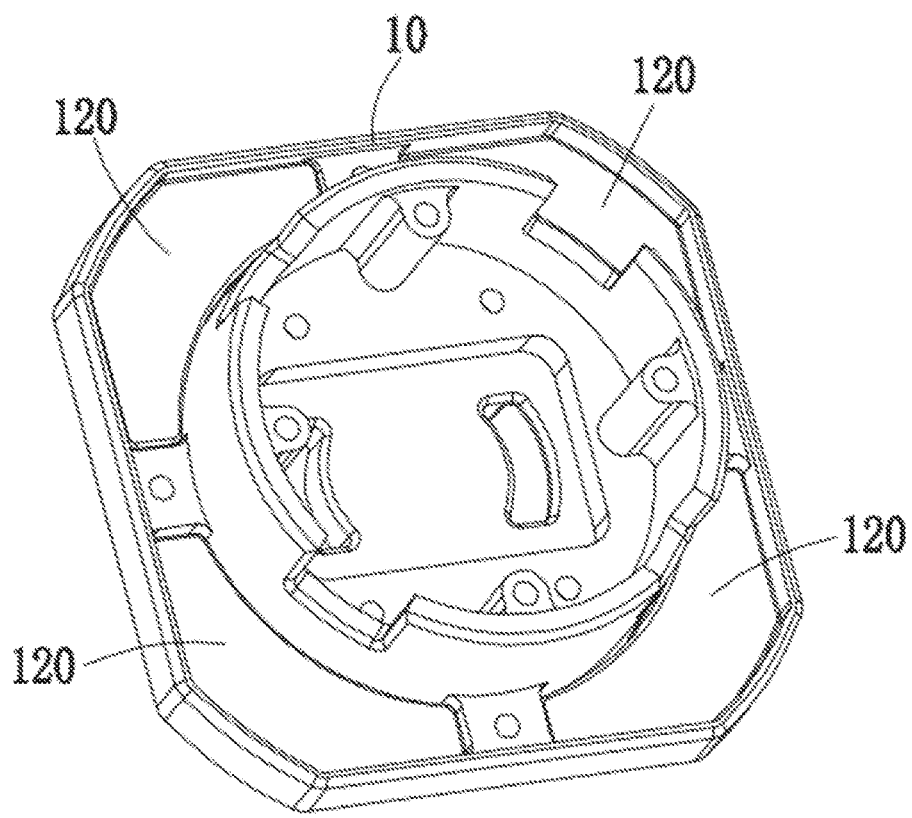
FIG. 7 is a structural view of a seat body of the quick-assembly seat according to the first embodiment of the present invention.

As shown in FIGS. 7 and 8, in an embodiment, the seat body 10 is internally provided with a plurality of magnetic members 120 along a circumferential direction, which can combine the seat body 10 with a quick-release part 40 made of metal or provided with a magnetic member 120 through magnetic connection. When the quick-release part 40 approaches the seat body 10, the magnetic attraction makes the quick-release part 40 easy to approach the seat body 10 to be clamped with the seat body 10. In this way, the assembly of the quick-release part 40 and the seat body 10 is labor-saving and convenient.

Figure 3:
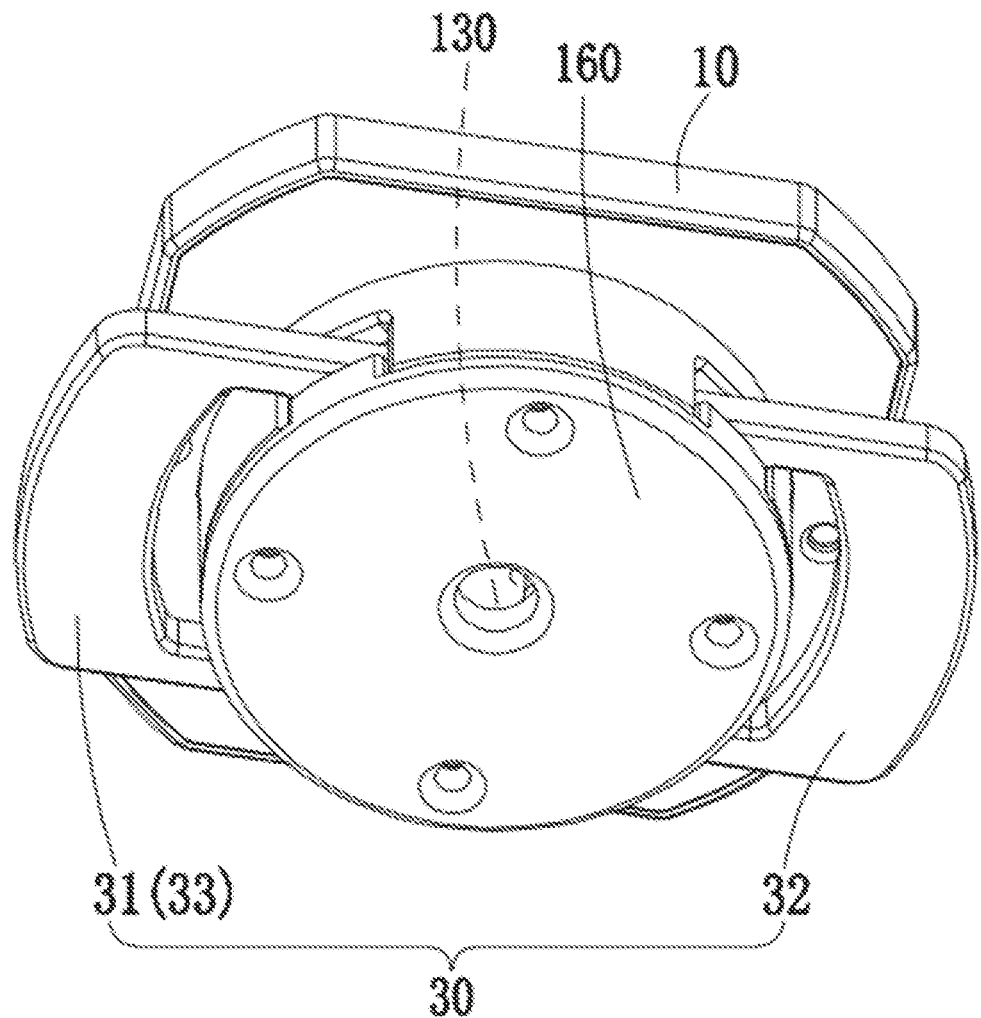
FIG. 3 is a structural view of the quick-assembly seat from another angle according to the first embodiment of the present invention.

As shown in FIGS. 3 and 8, in an embodiment, a bottom of the seat body 10 is detachably provided with a bottom cover 160 by a screw. A screw hole 130 is provided in a central position of the bottom cover 160. The screw hole 130 can be threadedly connected to a stud on a top of the tripod to mount the seat body 10 on the top of the tripod. Thus, the photographing device can be mounted on the top of the tripod through the quick-assembly seat 1 and the quick-release part 40, which facilitates photographing.

In the above detailed description, the sliding direction of the driving member 33 is perpendicular to the thickness direction of the seat body 10. As shown in FIGS. 17 to 22, the sliding direction of the driving member 33 is parallel to the thickness direction of the seat body 10, which is taken as an example for further description.

Figure 18:
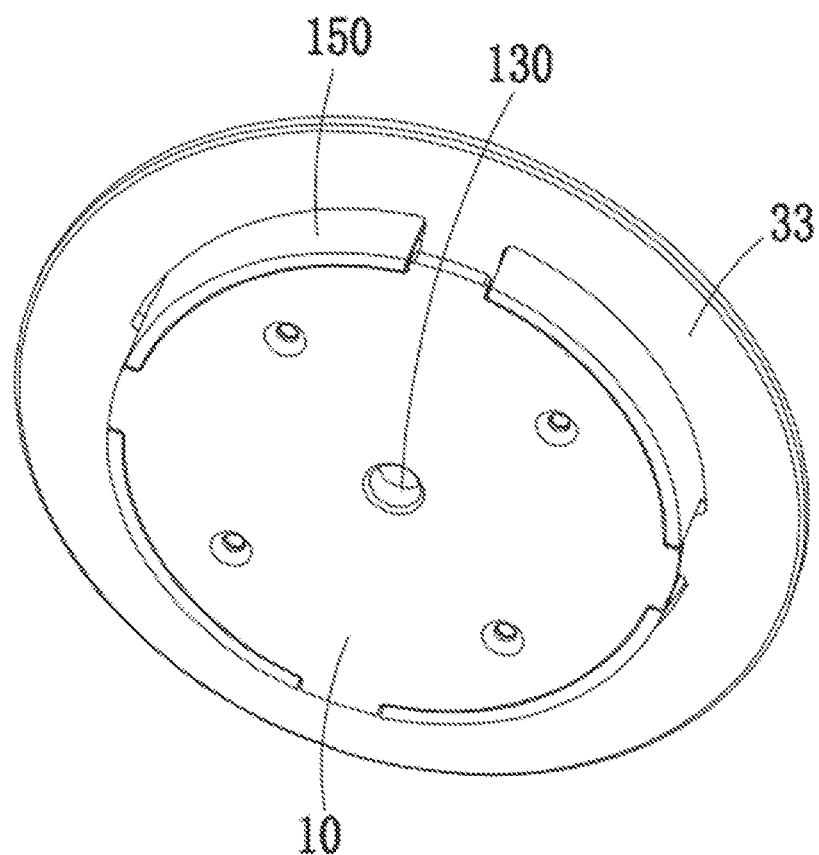
FIG. 18 is a structural view of the quick-assembly seat from another angle according to the second embodiment of the present invention.
Figure 19:
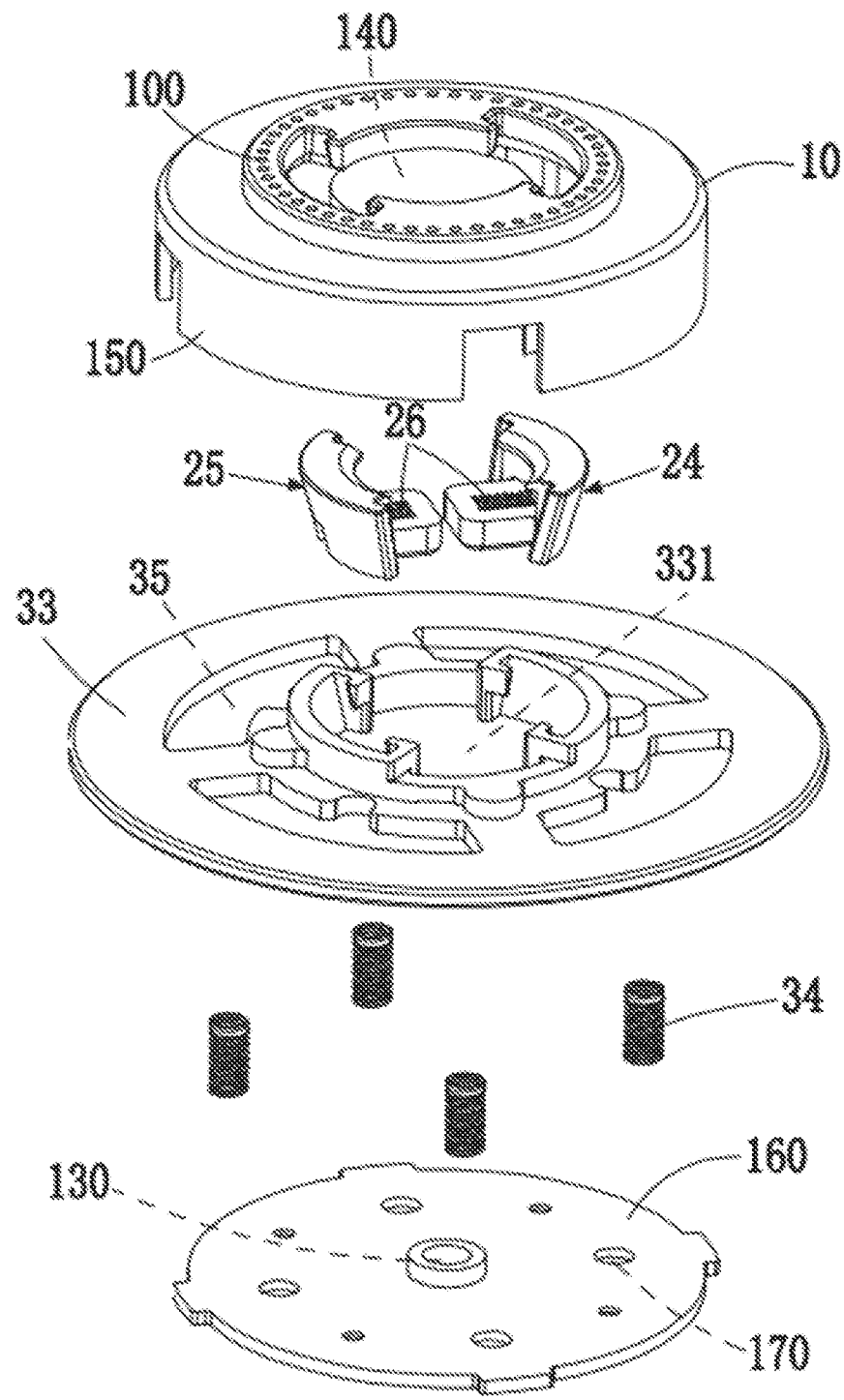
FIG. 19 is an exploded view of the quick-assembly seat according to the second embodiment of the present invention.
Figure 22:
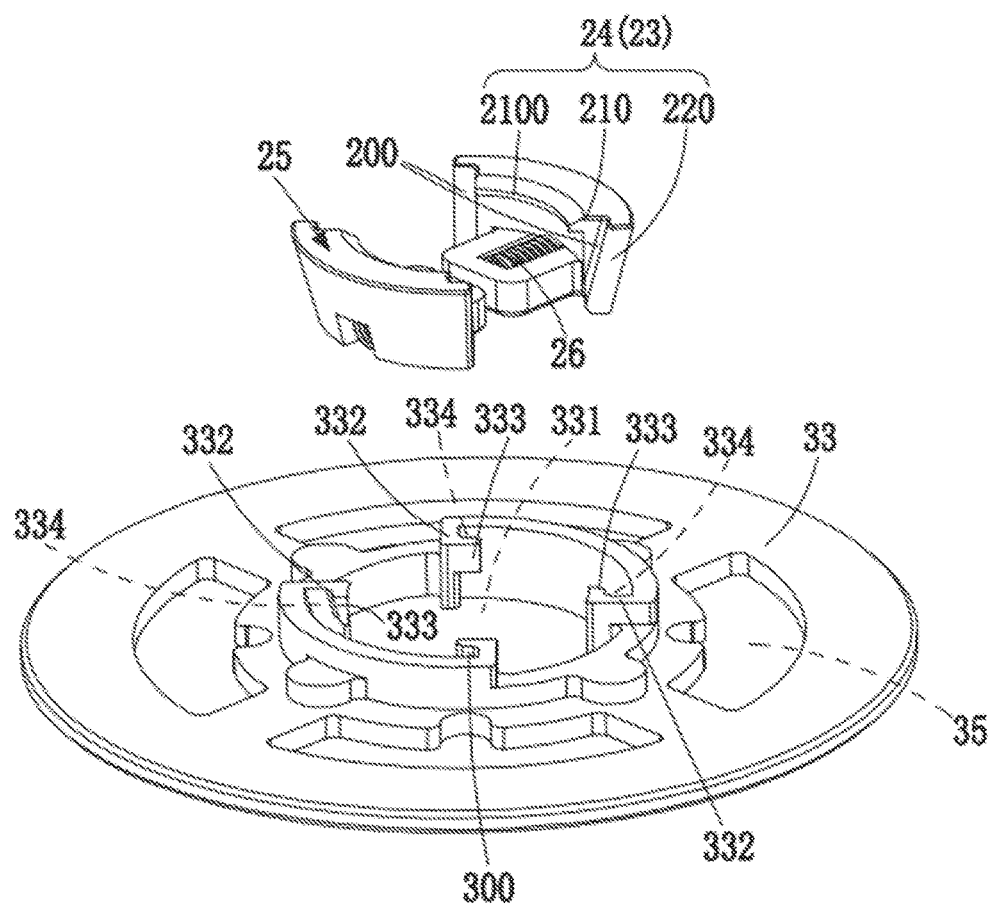
FIG. 22 is an exploded view of the clamping assembly of the quick-assembly seat and the quick-release part according to the second embodiment of the present invention.

As shown in FIGS. 18, 19 and 22, in an embodiment, the driving member 33 is disc-shaped, and the driving member 33 is slidably connected to the seat body 10 along the thickness direction of the seat body 10. The seat body 10 is provided with a plurality of guide members 150 along the circumferential direction, and the driving member 33 is provided with a plurality of guide grooves 35 along a circumferential direction. The plurality of guide members 150 are respectively inserted into the plurality of guide grooves 35, such that the driving member 33 is configured to slide along a height direction of the guide members 150. A through hole 331 is provided in a central position of the driving member 33. The through hole 331 defines an inner side wall of the driving member 33, and the inner side wall is provided with a limiting flange 332 along the circumferential direction. The limiting flange 332 is provided with a driving flange 333. The driving flange 333 and the limiting flange 332 are approximately L-shaped. The driving flange 333, the limiting flange 332 and the inner side wall form a stroke groove 334. The clamping member 23 is provided in the stroke groove 334 and is movable in the stroke groove 334. The driving flange 333 is provided with a second driving surface 300 facing the inner side wall, and the clamping member 23 is provided with a first driving surface 200 facing the driving flange 333. The first driving surface 200 and the second driving surface 300 are inclined surfaces, and respectively form an identical angle with the sliding direction of the driving member 33. The driving member 33 is provided with a pressing portion along the circumferential direction. The pressing portion protrudes out of the seat body 10. The user can press the pressing portion to drive the driving member 33 to slide relative to the seat body 10. The second driving surface 300 of the driving flange 333 presses against the first driving surface 200 of the clamping member 23, such that the clamping member 23 is moved in the stroke groove 334 to make the clamping member 23 clamped or unclamped with the quick-release part 40.

The driving member 33 may be provided with a plurality of limiting flanges 332 and driving flanges 333 to form a plurality of stroke grooves 334 with the inner side wall. The clamping member 23 is inserted into the plurality of stroke grooves 334 to stabilize the movement of the clamping member 23.

In an embodiment, the driving member 33 is provided with two limiting flanges 332 and two driving flanges 333. Two stroke grooves 334 are formed on the driving member 33, and left and right sides of the clamping member 23 are respectively inserted into the two stroke grooves 334. When the driving member 33 slides, the second driving surfaces 300 of the two driving flanges 333 simultaneously press against the first driving surfaces 200 on two sides of the clamping member 23 to jointly drive the clamping member 23 to move.

In the above design, the quick-release part 40 can be clamped or unclamped by only one clamping member 23. In addition, the quick-release part 40 can also be clamped or unclamped by two clamping members 23.

As shown in FIG. 22, in an embodiment, the clamping assembly 20 includes a third clamping member 24 and a fourth clamping member 25. The third clamping member 24 and the fourth clamping member 25 are oppositely arranged on the driving member 33. The driving member 33 is provided with four limiting flanges 332 and four driving flanges 333, and four stroke grooves 334 are formed on the driving member 33. Two stroke grooves 334 on one side are used for accommodating the third clamping member 24, and two stroke grooves 334 on the other side are used for accommodating the fourth clamping member 25. The four stroke grooves 334 are arranged symmetrically in pairs, such that the driving member 33 can drive the third clamping member 24 and the fourth clamping member 25 to move towards or away from each other on the same straight line.

Figure 23:
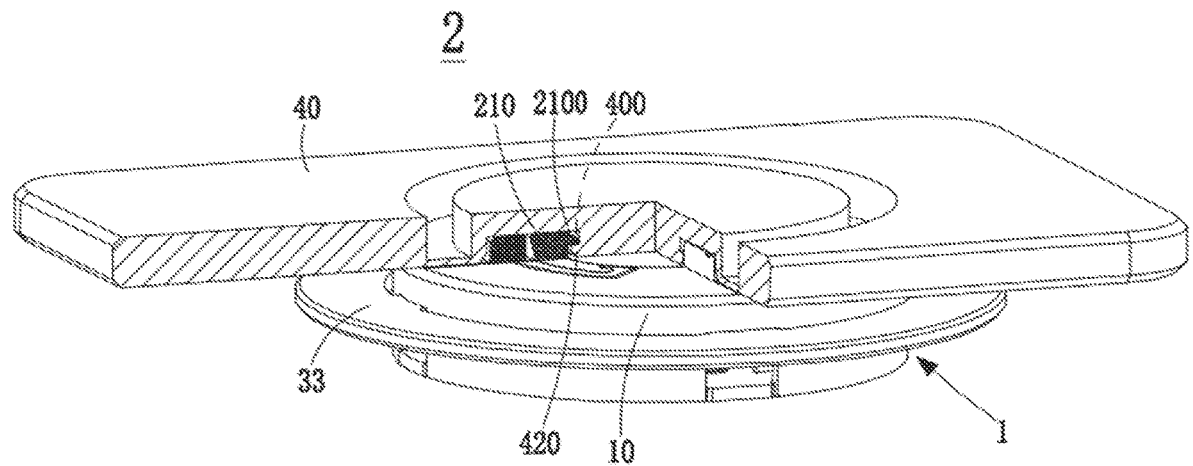
FIG. 23 is a partial sectional view of a quick-release assembly according to an embodiment of the present invention.

As shown in FIGS. 22 and 23, the clamping member 23 includes a connecting piece 220 and a hook 210 connected to each other, and first driving surfaces 200 are provided on the connecting piece 220. When the driving member 33 slides, the second driving surfaces 300 press against the first driving surfaces 200 to drive the connecting piece 220 and the hook 210 to slide relative to the seat body 10 such that the hook 210 is clamped or unclamped with the quick-release part 40.

A direction from an end of the clamping member 23 without the hook 210 to an end with the hook 210 is defined as upward, and vice versa. The driving member 33 is configured to slide upward or downward relative to the seat body 10 to drive the third clamping member 24 and the fourth clamping member 25 to slide. The third clamping member 24 and the fourth clamping member may slide toward or away from each other, depending on the inclination direction of the first driving surfaces 200 and the second driving surfaces 300.

Figure 21:
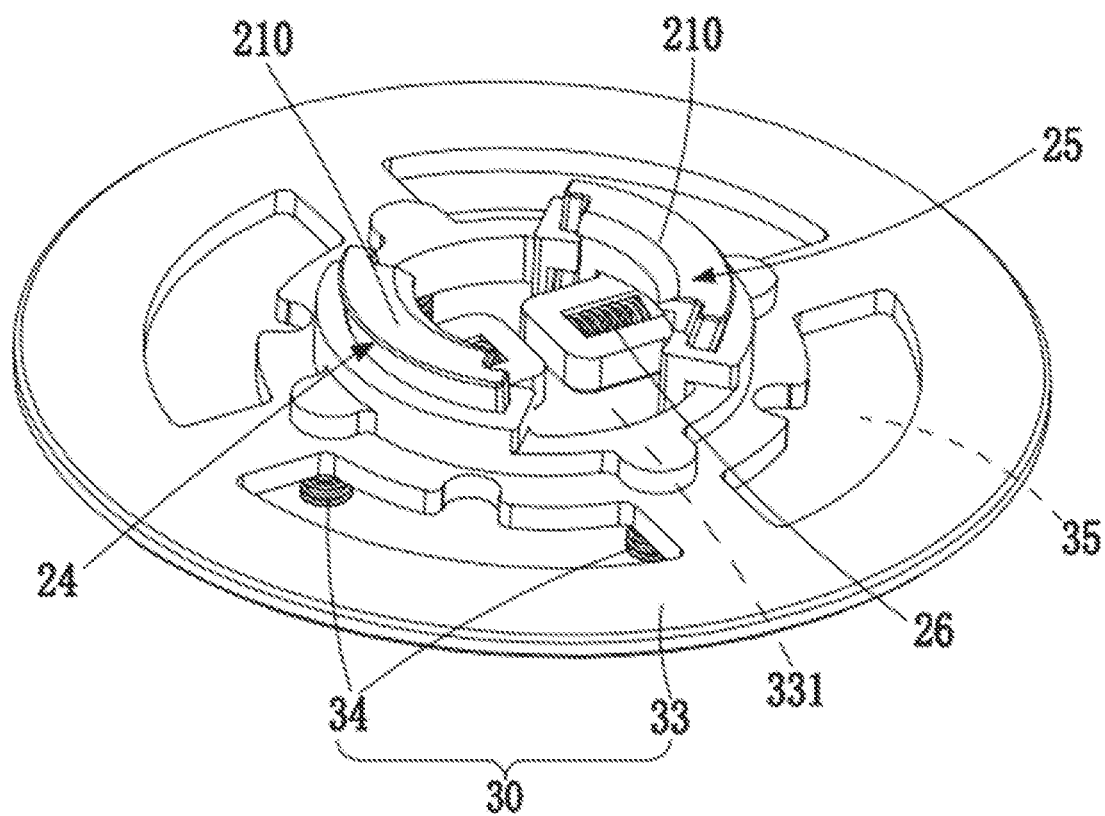
FIG. 21 is a connection view of a clamping assembly of the quick-assembly seat and a quick-release part according to the second embodiment of the present invention.

As shown in FIGS. 21, 22 and 23, in an embodiment, in the downward direction, the two first driving surfaces 200 of the third clamping member 24 and the two first driving surfaces 200 of the fourth clamping member 25 are contracted, and all the second driving surfaces 300 of the driving member 33 are also contracted. The driving member 33 is configured to slide downward relative to the seat body 10 to drive the third clamping member 24 and the fourth clamping member 25 to slide away from each other. At this time, the two clamping members 23 may be clamped with the quick-release part 40 or unclamped with the quick-release part 40. This depends on the orientation of the hooks 210 of the two clamping members 23 and whether the clamping groove 400 of the quick-release part 40 is provided inside or outside the two hooks 210.

As shown in FIGS. 22 and 23, when the clamping groove 400 of the quick-release part 40 is provided inside the two hooks 210 and the two hooks 210 are arranged oppositely, the driving member 33 drives the two clamping members 23 to slide away from each other. The hooks 210 of the two clamping members 23 are separated from the clamping groove 400 of the quick-release part 40 to unclamp the quick-release part 40.

When the clamping groove 400 of the quick-release part 40 is provided outside the two hooks 210 and the two hooks 210 are arranged oppositely, the driving member 33 drives the two clamping members 23 to slide away from each other. The hooks 210 of the two clamping members 23 are inserted into the clamping groove 400 of the quick-release part 40 to clamp the quick-release part 40.

In another embodiment, in the upward direction, the two first driving surfaces 200 of the third clamping member 24 and the two first driving surfaces 200 of the fourth clamping member 25 are contracted, and all the second driving surfaces 300 on the driving member 33 are also contracted. in this embodiment, the driving member 33 is configured to slide upward relative to the seat body 10 to drive the third clamping member 24 and the fourth clamping member 25 to slide away from each other, thereby clamping or unclamping the quick-release part 40.

The above embodiments describe in detail the point-to-surface abutment, edge-to-surface abutment and surface-to-surface abutment of the driving member 33 and the clamping member 23, as well as the first driving surface 200 and the second driving surface 300 that are inclined surfaces. However, it should be noted that the interaction between the driving member 33 and the clamping member 23 is not exhaustive. The driving member 33 and the clamping member 23 may also abut against each other through other shapes not mentioned above to allow the driving member 33 to drive the clamping member 23 to slide relative to the seat body 10, thereby clamping or unclamping the quick-release part 40.

Figure 20:
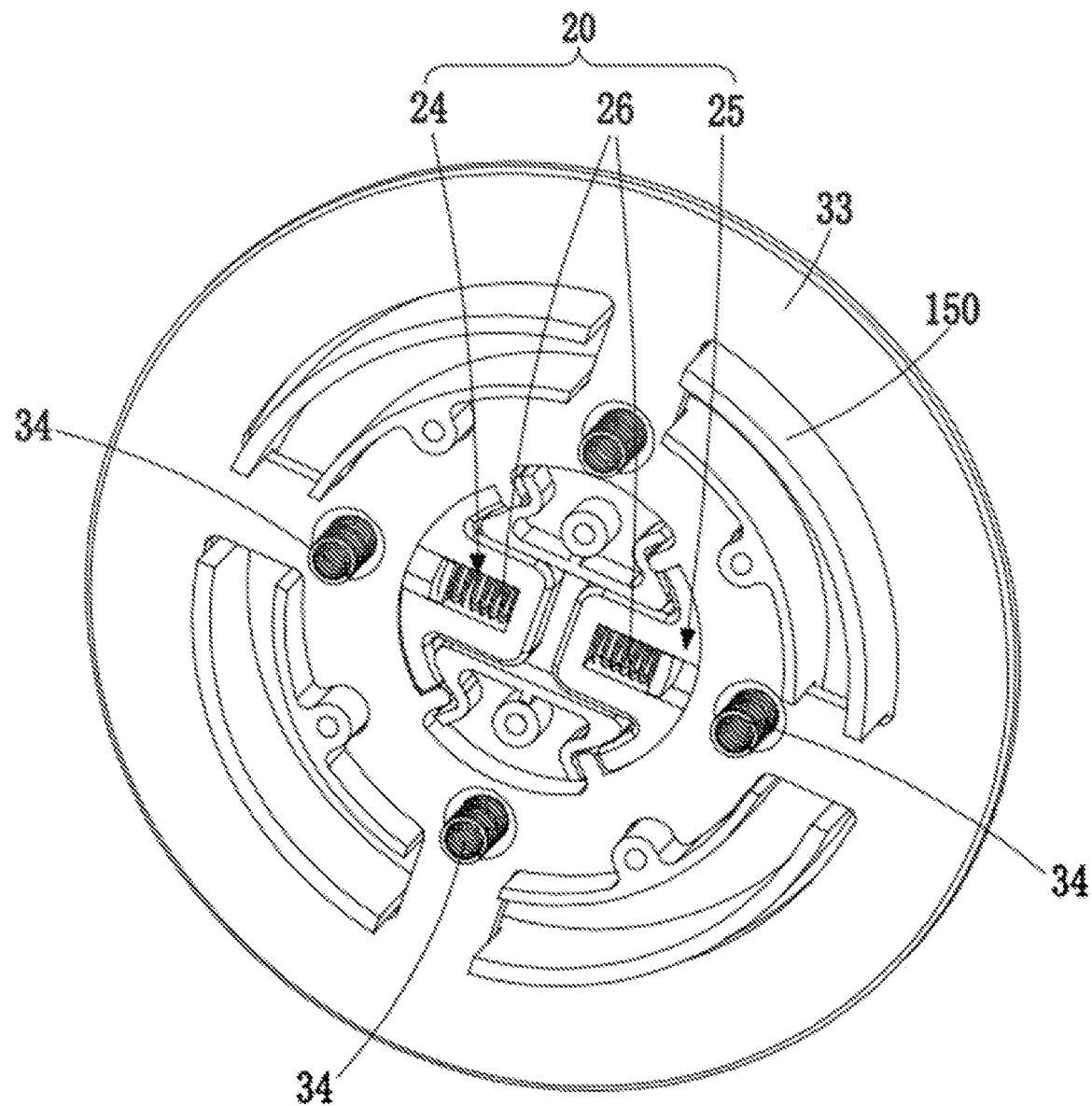
FIG. 20 is an interior view of the quick-assembly seat according to the second embodiment of the present invention.

As shown in FIG. 20, in an embodiment, the clamping assembly 20 further includes two second return springs 26. Among them, one end of one second return spring 26 is connected to the third clamping member 24 and the other end thereof is connected to the seat body 10, and one end of the other second return spring 26 is connected to the fourth clamping member 25 and the other end thereof is connected to the seat body 10. When subjected to an external force, the third clamping member 24 and the fourth clamping member 25 are configured to slide away from each other, while the two second return springs 26 accumulate an elastic force. When the external force disappears, the two second return springs 26 release the elastic force to drive the third clamping member 24 and the fourth clamping member 25 to slide toward each other.

As shown in FIGS. 21 and 23, in an embodiment, the driving assembly 30 further includes a third return spring 34. There may be a plurality of third return springs 34. The plurality of third return springs 34 are evenly arranged along the circumferential direction of the driving member 33. The plurality of third return springs 34 each have one end connected to the seat body 10 and the other end connected to the driving member 33. The bottom cover 160 of the seat body 10 is provided with fixing grooves 170. The plurality of third return springs 34 are respectively located in the fixing grooves 170, and the fixing grooves 170 position the third return springs 34 to prevent deviation. When an external force is applied to the driving member 33, the driving member 33 slides downward to drive the third clamping member 24 and the fourth clamping member 25 to slide away from each other, while the plurality of third return springs 34 accumulate an elastic force. When the external force disappears, the plurality of third return springs 34 release the elastic force to drive the driving member 33 to slide upward to reset, such that the third clamping member 24 and the fourth clamping member 25 slide toward each other to reset, waiting for the next time of unclamping of the quick-release part 40.

As shown in FIGS. 19 and 23, in an embodiment, a side of the seat body 10 facing the quick-release part 40 is provided with a connecting groove 140. A side of the quick-release part 40 facing the seat body 10 is provided with a protruding base 420, and the protruding base 420 is provided with the clamping groove 400 along a circumferential direction. To connect the quick-release part 40 to the seat body 10, the protruding base of the quick-release part 40 is inserted into the connecting groove 140. During this process, the protruding base 420 presses against the hooks 210 of the third clamping member 24 and the fourth clamping member 25 and drives the two hooks 210 to slide away from each other. The two second return springs 26 accumulate an elastic force. When the clamping groove 400 of the protruding base 420 is aligned with the clamping flanges 2100 of the hooks 210, the two second return springs 26 release the elastic force to drive the two hooks 210 to slide toward each other to be clamped with the clamping groove 400. Thus, the quick-release part 40 is connected to the seat body 10.

To disassemble the quick-release part 40 from the seat body 10, the driving member 33 is manually pressed to slide downward relative to the seat body 10. The second driving surfaces 300 of the driving member 33 press against the first driving surfaces 200 of the third clamping member 24 and the fourth clamping member 25. The hook 210 of the third clamping member 24 and the hook 210 of the fourth clamping member 25 are driven to slide away from each other. The two hooks 210 are separated from the clamping groove 400 of the protruding base, such that the quick-release part 40 is unclamped. At this time, the protruding base of the quick-release part 40 can be withdrawn from the connecting groove 140 of the seat body 10.

As shown in FIG. 23, the present invention further provides a quick-release assembly 2, which includes a quick-release part 40 and the quick-assembly seat 1. A clamping groove 400 is provided on a side of the quick-release part 40 facing the quick-assembly seat 1. The clamping groove 400 is clamped with the clamping member 23. The driving member 33 is configured to slide relative to the seat body 10 to drive the clamping member 23 to slide relative to the seat body 10 so as to clamp or unclamp the quick-release part 40. The quick-assembly seat 1 can be connected to a tripod. The quick-release part 40 can be connected to a photographing device such as a mobile phone or a camera, such that the photographing device can be mounted on the tripod for easy photographing.

The driving member 33 and the clamping member 23 may be in surface-to-surface abutment to drive the clamping member 23 to slide. That is, the driving member 33 may be provided with a second driving surface 300, and the clamping member 23 may be provided with a first driving surface 200, The second driving surface 300 of the driving member 33 presses against the first driving surface 200 of the clamping member 23 to drive the clamping member 23 to slide relative to the seat body 10 so as to clamp or unclamp the quick-release part 40. In this way, the photographing device can be quickly assembled with or disassembled from the tripod.

The technical characteristics of the above embodiments may be employed in arbitrary combinations. In an effort to provide a concise description of these embodiments, all possible combinations of all technical characteristics of the embodiments may not be described. However, these combinations of technical characteristics should be construed as disclosed in the description in case no contradiction occurs.

The above embodiments are intended to illustrate several implementations of the present invention in detail, and they should not be construed as a limitation to the patentable scope of the present invention. It should be pointed out that those of ordinary skill in the art may further make several modifications, substitutions and improvements without departing from the concept of the present invention, which should be covered by the scope of protection of the present invention. Therefore, the protection scope of the present invention should be subject to the claims.

What is claimed is:

1. A quick-assembly seat for connecting a quick-release part, comprising:
   a seat body;
   a clamping assembly, comprising a clamping member slidably connected to the seat body; and
   a driving assembly, comprising a driving member slidably connected to the seat body;
   wherein the driving member is configured to slide relative to the seat body to press against the clamping member and drive the clamping member to slide relative to the seat body to clamp or unclamp the quick-release part;
   the clamping member comprises a first driving surface, and the driving member comprises a second driving surface;
   at least one of the first driving surface and the second driving surface is not perpendicular, but forms an angle, to a sliding direction of the driving member; and
   the driving member is configured to slide relative to the seat body, wherein the second driving surface presses against the first driving surface, and the clamping member is driven to slide relative to the seat body to clamp or unclamp the quick-release part.

2. The quick-assembly seat according to claim 1, wherein the first driving surface and the second driving surface are arc surfaces; and
   a sliding direction of the clamping member is perpendicular to the sliding direction of the driving member.

3. The quick-assembly seat according to claim 1, wherein one of the first driving surface and the second driving surface is an arc surface, and the other one of the first driving surface and the second driving surface is an inclined surface; and
   a sliding direction of the clamping member is perpendicular to the sliding direction of the driving member.

4. The quick-assembly seat according to claim 1, wherein the first driving surface and the second driving surface are inclined surfaces, and the first driving surface and the second driving surface respectively form an identical angle to the sliding direction of the driving member; and a sliding direction of the clamping member is perpendicular to the sliding direction of the driving member.

5. The quick-assembly seat according to claim 1, wherein
the sliding direction of the driving member is perpendicular to a thickness direction of the seat body;
the clamping member comprises a connecting piece and a hook, wherein the connecting piece and the hook are connected;
the first driving surface is provided on the connecting piece; and
the second driving surface is configured to press against the first driving surface to drive the connecting piece and the hook to slide relative to the seat body, wherein the hook is allowed to clamp or unclamp the quick-release part.

6. The quick-assembly seat according to claim 5, wherein
the connecting piece comprises a first strip-shaped element and a second strip-shaped element, wherein the first strip-shaped element and the second strip-shaped element are connected to the hook;
each of the first strip-shaped element and the second strip-shaped element comprises the first driving surface;
the driving assembly comprises a first driving member and a second driving member, wherein the first driving member and the second driving member are opposite to each other;
each of the first driving member and the second driving member comprises the second driving surface;
the first driving member and the second driving member are configured to slide toward each other, wherein the second driving surface of the first driving member and the second driving surface of the second driving member respectively press against the first driving surface of the first strip-shaped element and the first driving surface of the second strip-shaped element; and
the hook slides relative to the seat body, wherein the hook is allowed to clamp or unclamp the quick-release part.

7. The quick-assembly seat according to claim 6, wherein
the first driving member is provided with a first driving groove facing the first strip-shaped element, and the second driving member is provided with a second driving groove facing the second strip-shaped element;
the second driving surface is respectively formed in the first driving groove facing the first strip-shaped element and the second driving groove facing the second strip-shaped element; and
when the first driving member and the second driving member slide toward each other, the second driving surface abuts against the first driving surface, wherein the first strip-shaped element and the second strip-shaped element are driven to be accommodated in the first driving groove and the second driving groove, respectively.

8. The quick-assembly seat according to claim 6, wherein
the clamping assembly comprises a first clamping member and a second clamping member, wherein the first clamping member and the second clamping member have an identical structure;
the first driving member and the second driving member are configured to slide toward each other, wherein the second driving surface of the first driving member and the second driving surface of the second driving member respectively press against the first driving surface of the first clamping member and the first driving surface of the second clamping member; and
the first clamping member and the second clamping member slide relative to the seat body, wherein the hook of the first clamping member and the hook of the second clamping member clamp or unclamp the quick-release part.

9. The quick-assembly seat according to claim 8, wherein
the first driving surface and the second driving surface are not perpendicular to the sliding direction of the first driving member or the second driving member;
in a direction from the first clamping member to the second clamping member, two first driving surfaces of the first clamping member are expanded, and two first driving surfaces of the second clamping member are contracted;
in a direction from the first driving member to the second driving member, two second driving surfaces of the first driving member are expanded, and two second driving surfaces of the second driving member are contracted; and
the two second driving surfaces of the first driving member press against the two first driving surfaces of the first clamping member, and the two second driving surfaces of the second driving member press against the two first driving surfaces of the second clamping member, wherein the first clamping member and the second clamping member slide toward each other to clamp or unclamp the quick-release part.

10. The quick-assembly seat according to claim 1, wherein
the sliding direction of the driving member is parallel to a thickness direction of the seat body;
the clamping member comprises a connecting piece and a hook, wherein the connecting piece and the hook are connected;
the first driving surface is provided on the connecting piece; and
the second driving surface is configured to press against the first driving surface to drive the connecting piece and the hook to slide relative to the seat body, wherein the hook is allowed to clamp or unclamp the quick-release part.

11. The quick-assembly seat according to claim 10, wherein
the clamping assembly comprises a first clamping member and a second clamping member, wherein the first clamping member and the second clamping member have an identical structure and are opposite to each other;
the driving member comprises two second driving surfaces opposite to each other;
the driving member is configured to slide relative to the seat body, wherein the two second driving surfaces respectively press against the first driving surface of the first clamping member and the first driving surface of the second clamping member, and the hook of the first clamping member and the hook of the second clamping member slide relative to the seat body to clamp or unclamp the quick-release part.

12. The quick-assembly seat according to claim 11, wherein
in a direction from a first end of the first clamping member to a second end of the first clamping member, the first driving surface of the first clamping member and the first driving surface of the second clamping member are contracted, and the two second driving surfaces of the driving member are also contracted, wherein the first end of the first clamping member is provided with the hook, and the second end of the first clamping member is not provided with the hook.

13. The quick-assembly seat according to claim 1, wherein the quick-assembly seat further comprises an elastic member;

the elastic member connects the seat body to the clamping member;

when the driving member drives the clamping member to slide relative to the seat body, the clamping member drives the elastic member to accumulate an elastic force; and the elastic member is configured to release the elastic force to drive the clamping member to slide relative to the seat body.

14. A quick-release assembly, comprising:

a quick-release part, and the quick-assembly seat according to claim 1;

wherein a side of the quick-release part is provided with a clamping groove, wherein the side of the quick-release part faces the quick-assembly seat;

the clamping groove is matched with the clamping member for clamping; and the driving member is configured to slide relative to the seat body to press against the clamping member, wherein the clamping member is driven to slide relative to the seat body to unclamp the quick-release part.

15. The quick-release assembly according to claim 14, wherein when the quick-release part approaches the seat body, the seat body is allowed to be magnetically connected to the quick-release part to align the clamping member and the clamping groove.

16. The quick-release assembly according to claim 15, wherein the seat body is internally provided with a plurality of magnetic members along a circumferential direction, and the quick-release part comprises a metal member or a magnetic member; and the plurality of magnetic members of the seat body are configured to be magnetically connected to the metal member or the magnetic member of the quick-release part to align the clamping member and the clamping groove.

17. A photographing apparatus, comprising:

an electronic device, and the quick-release assembly according to claim 14;

wherein the electronic device is mounted on the quick-release part.

18. The photographing apparatus according to claim 17, wherein the electronic device is a mobile phone or a camera.

19. A quick-assembly seat for connecting a quick-release part, comprising:

a seat body;

a clamping assembly, comprising a clamping member slidably connected to the seat body; and a driving assembly, comprising a driving member slidably connected to the seat body;

wherein the driving member is configured to slide relative to the seat body to press against the clamping member and drive the clamping member to slide relative to the seat body to clamp or unclamp the quick-release part;

the quick-assembly seat further comprises a magnetic member provided on the seat body;

when the driving member drives the clamping member to slide relative to the seat body, the clamping member drives the magnetic member to accumulate a magnetic force; and the magnetic member is configured to release the magnetic force to drive the clamping member to slide relative to the seat body.

* * * * *